US010075943B2

(12) United States Patent
Takeda et al.

(10) Patent No.: US 10,075,943 B2
(45) Date of Patent: Sep. 11, 2018

(54) USER TERMINAL, BASE STATION AND TRANSMISSION CONTROL METHOD

(71) Applicant: NTT DOCOMO, INC., Tokyo (JP)

(72) Inventors: Kazuki Takeda, Tokyo (JP); Satoshi Nagata, Tokyo (JP); Hiroyuki Ishii, Palo Alto, CA (US)

(73) Assignee: NTT DOCOMO, INC., Tokyo (JP)

( * ) Notice: Subject to any disclaimer, the term of this patent is extended or adjusted under 35 U.S.C. 154(b) by 176 days.

(21) Appl. No.: 15/024,594

(22) PCT Filed: Sep. 10, 2014

(86) PCT No.: PCT/JP2014/073883
§ 371 (c)(1),
(2) Date: Mar. 24, 2016

(87) PCT Pub. No.: WO2015/045864
PCT Pub. Date: Apr. 2, 2015

(65) Prior Publication Data
US 2016/0249345 A1      Aug. 25, 2016

(30) Foreign Application Priority Data
Sep. 26, 2013    (JP) .................................. 2013-199189

(51) Int. Cl.
*H04L 1/00* (2006.01)
*H04W 72/04* (2009.01)
(Continued)

(52) U.S. Cl.
CPC ....... *H04W 72/0413* (2013.01); *H04L 1/1671* (2013.01); *H04L 1/1861* (2013.01);
(Continued)

(58) Field of Classification Search
CPC .. H04J 11/00; H04J 13/004; H04J 2011/0003; H04J 2011/0006;
(Continued)

(56) References Cited

U.S. PATENT DOCUMENTS

2013/0028149 A1 * 1/2013 Chen ..................... H04L 5/0005
370/280
2013/0170406 A1   7/2013 Kishiyama
2014/0334395 A1   11/2014 Lee et al.

FOREIGN PATENT DOCUMENTS

WO      2012/161510 A2    11/2012

OTHER PUBLICATIONS

Extended European Search Report issued in corresponding European Application No. 14848047.8, dated Jun. 2, 2017 (9 pages).
(Continued)

*Primary Examiner* — Dady Chery
(74) *Attorney, Agent, or Firm* — Osha Liang LLP

(57) ABSTRACT

The present invention is designed so that uplink transmission is carried out adequately even when CA to apply different duplex modes between multiple cells is executed. A user terminal communicates with an FDD cell and a TDD cell by employing carrier aggregation, and has a receiving section that receives DL signals transmitted from each cell, a transmission control section that allocates and transmits delivery acknowledgement signals in response to the received DL signals, channel quality information or scheduling requests in predetermined UL subframes, and, when a UL subframe is configured in both the FDD cell and the TDD cell, the transmission control section transmits a delivery acknowledgement signal in one UL subframe or both UL subframes, and controls whether or not to transmit channel
(Continued)

FDD+FDD

TDD+TDD

FDD+TDD quality information or a scheduling request having an overlapping transmission timing with the delivery acknowledgement signal.

10 Claims, 13 Drawing Sheets

(51) Int. Cl.
*H04L 5/00* (2006.01)
*H04W 74/08* (2009.01)
*H04L 5/14* (2006.01)
*H04L 1/16* (2006.01)
*H04L 1/18* (2006.01)
*H04W 72/12* (2009.01)

(52) U.S. Cl.
CPC .............. *H04L 5/00* (2013.01); *H04L 5/14* (2013.01); *H04W 72/0446* (2013.01); *H04W 72/1226* (2013.01); *H04W 74/08* (2013.01); *H04W 72/12* (2013.01)

(58) Field of Classification Search
CPC ....... H04J 2011/0009; H04J 2011/0013; H04J 2011/0016; H04J 2011/002; H04J 3/1676; H04L 5/0007; H04L 27/32; H04L 27/34; H04L 25/4902; H04B 14/026
USPC .................................. 370/203–208, 276–282
See application file for complete search history.

(56) References Cited

OTHER PUBLICATIONS

International Search Report issued in corresponding application No. PCT/JP2014/073883 dated Dec. 16, 2014 (4 pages).
Written Opinion of the International Searching Authority issued in corresponding application No. PCT/JP2014/073883 dated Dec. 16, 2014 (3 pages).
3GPP TS 36.300 V11.4.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)"; Dec. 2012 (208 pages).

* cited by examiner

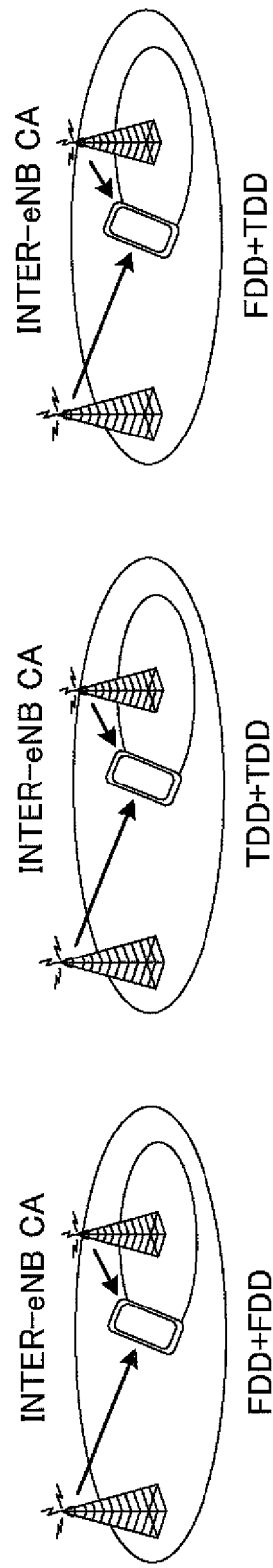
FIG.2A
FIG.2B
FIG.2C

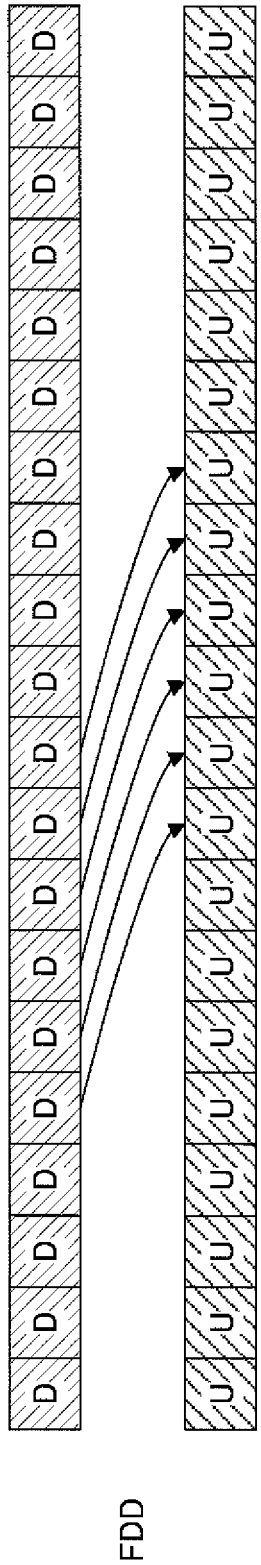
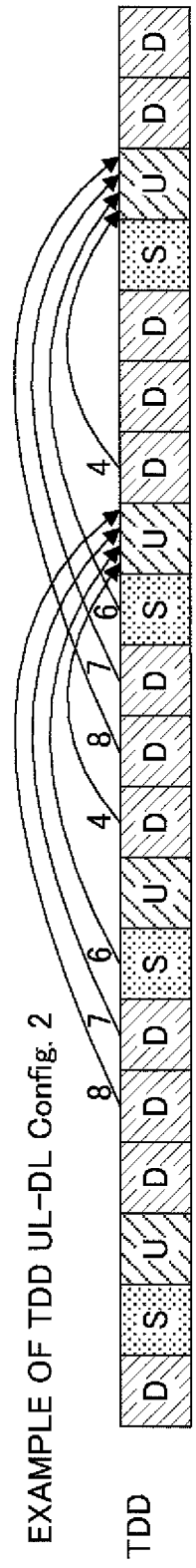
FIG.3A
FIG.3B

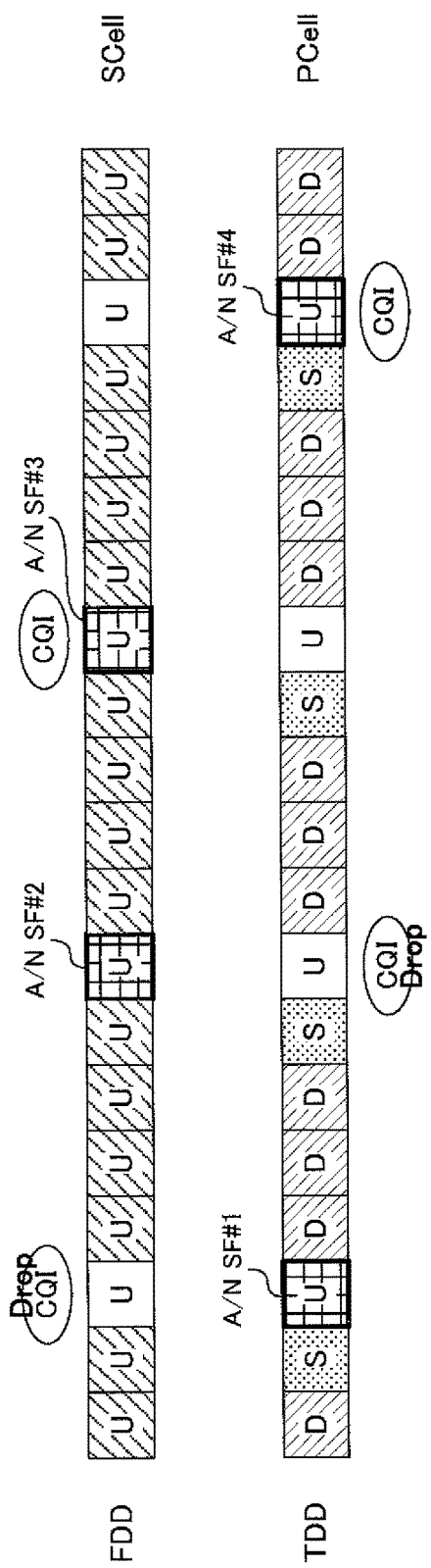
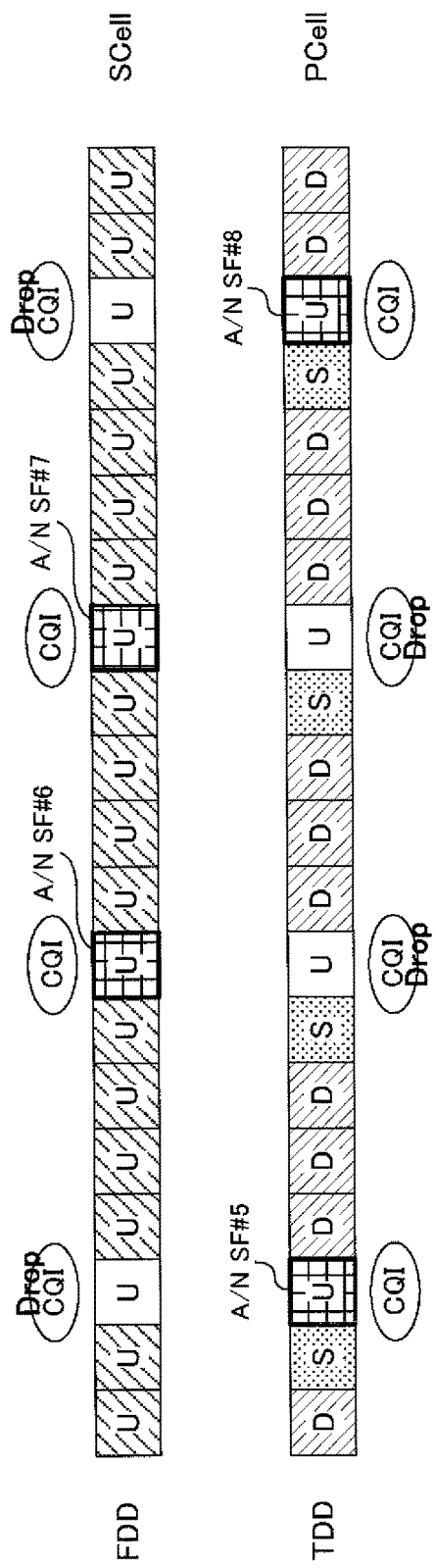
FIG.6A
FIG.6B

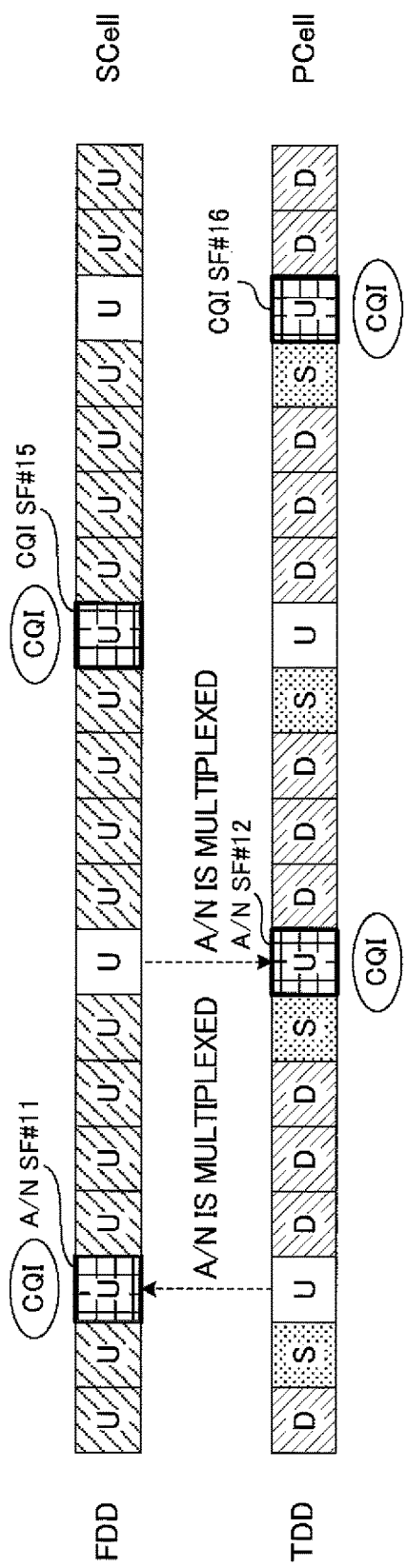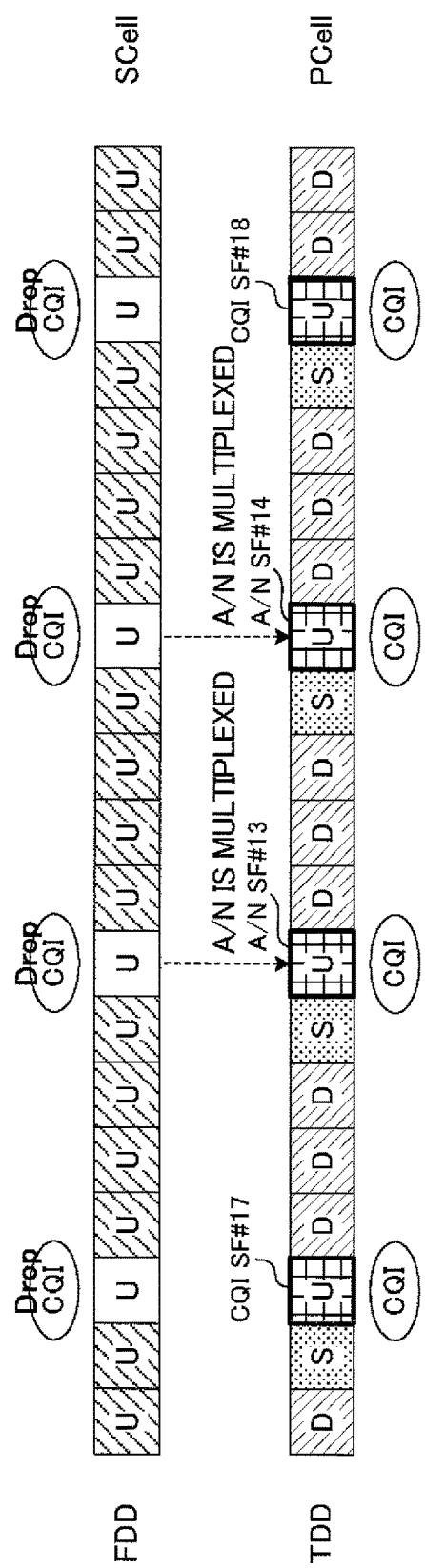

USER TERMINAL, BASE STATION AND TRANSMISSION CONTROL METHOD

TECHNICAL FIELD

The present invention relates to a user terminal, a base station and a transmission control method that are applicable to a next-generation communication system.

BACKGROUND ART

In the UMTS (Universal Mobile Telecommunications System) network, the specifications of long term evolution (LTE) have been drafted for the purpose of further increasing high speed data rates, providing lower delay and so on (see non-patent literature 1). In LTE, as multiple-access schemes, a scheme that is based on OFDMA (Orthogonal Frequency Division Multiple Access) is used in downlink channels (downlink), and a scheme that is based on SC-FDMA (Single Carrier Frequency Division Multiple Access) is used in uplink channels (uplink). Also, successor systems of LTE (referred to as, for example, "LTE-advanced" or "LTE enhancement" (hereinafter referred to as "LTE-A")) are under study for the purpose of achieving further broadbandization and increased speed beyond LTE, and the specifications thereof have been drafted (Rel. 10/11).

As duplex modes for radio communication in the LTE and LTE-A systems, there are frequency division duplex (FDD) to divide between the uplink (UL) and the downlink (DL) based on frequency, and time division duplex (TDD) to divide between the uplink and the downlink based on time (see FIG. 1A). In TDD, the same frequency region is applied to uplink and downlink communication, and signals are transmitted and received to and from one transmitting/receiving point by dividing the uplink and the downlink based on time.

Also, the system band of the LTE-A system (Rel. 10/11) includes at least one component carrier (CC), where the system band of the LTE system constitutes one unit. Gathering a plurality of component carriers (cells) to achieve a wide band is referred to as "carrier aggregation" (CA).

CITATION LIST

Non-Patent Literature

Non-Patent Literature 1: 3GPP TS 36.300 "Evolved UTRA and Evolved UTRAN Overall Description"

SUMMARY OF INVENTION

Technical Problem

In carrier aggregation (CA), which was introduced in Rel. 10/11, the duplex mode to employ between a plurality of CCs (also referred to as "cells," "transmitting/receiving points," etc.) is limited to the same duplex-mode (see FIG. 1B). On the other hand, future radio communication systems (for example, Rel. 12 and later versions) may anticipate CA to employ different duplex modes (TDD+FDD) between multiple CCs (see FIG. 1C).

Also, Rel. 10/11 anticipates intra-base station CA (intra-eNB CA), which controls CA by using one scheduler between multiple CCs. In this case, the PUCCH signals (delivery acknowledgement signals (ACKs/NACKs), channel quality information (CQI), etc.) that are transmitted in each CC in response to DL data signals (PDSCH signals) are multiplexed to be aggregated in a specific CC (primary cell (PCell)) and transmitted.

When conventional feedback mechanism is used in CA in which different duplex modes (TDD+FDD) are employed between multiple CCs, there is a risk that delivery acknowledgement signals, channel quality information and so on cannot be transmitted adequately on the uplink.

The present invention has been made in view of the above, and it is therefore an object of the present invention to provide a user terminal, a base station and a transmission control method, whereby uplink transmission can be carried out adequately even when CA is executed by applying different duplex modes between multiple cells.

Solution to Problem

The user terminal according to the present invention provides a user terminal that communicates with an FDD cell and a TDD cell by employing carrier aggregation, and this user terminal has a receiving section that receives DL signals transmitted from each cell, and a transmission control section that allocates and transmits delivery acknowledgement signals in response to the received DL signals, channel quality information or scheduling requests in predetermined UL subframes, and, when a UL subframe is configured in both the FDD cell and the TDD cell, the transmission control section transmits a delivery acknowledgement signal in one UL subframe or both UL subframes, and controls whether or not to transmit channel quality information or a scheduling request having an overlapping transmission timing with the delivery acknowledgement signal.

Advantageous Effects of Invention

According to the present invention, it is possible to carry out uplink transmission adequately even when CA is executed by applying different duplex modes between multiple cells.

BRIEF DESCRIPTION OF DRAWINGS

FIG. 2 provides diagrams to explain intra-base station CA (intra-eNB CA) and inter-base station CA (inter-eNB CA);

FIG. 3 provides diagrams to explain DL HARQ timings (uplink A/N feedback timings) in FDD and TDD;

FIG. 6 provides diagrams to explain examples of the transmission control method according to a first example in TDD–FDD CA;

FIG. 7 provides diagrams to explain examples of the transmission control method according to a second example in TDD–FDD CA;

DESCRIPTION OF EMBODIMENTS

Figure 1A:
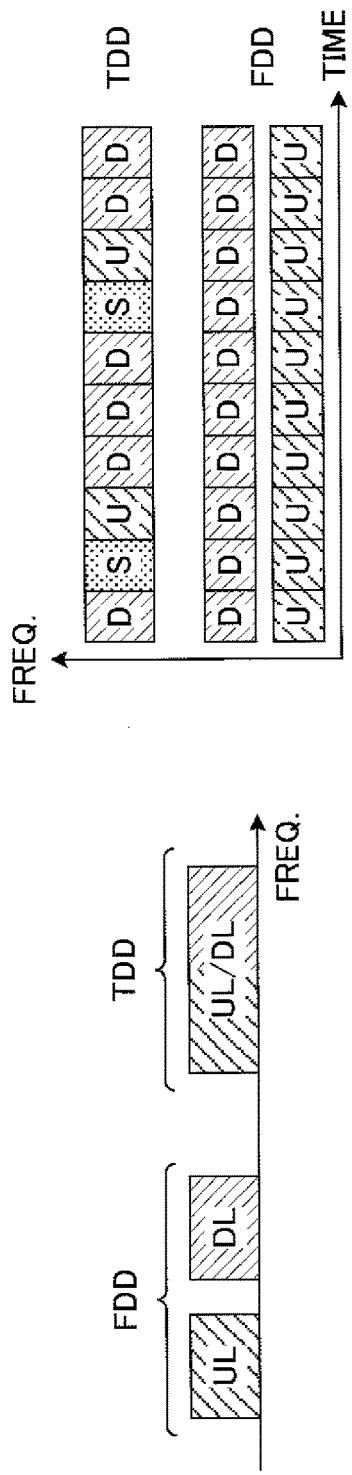
FIG. 1 provides diagrams to explain an overview of duplex modes in LTE and LTE-A, and intra-base station CA (intra-eNB CA)

As noted earlier, two duplex modes—namely, FDD and TDD—are stipulated in the LTE and LTE-A systems (see above FIG. 1A). Also, from Rel. 10 onward, support for intra-base station CA (intra-eNB CA) has been provided. However, CA in Rel. 10/11 is limited to the use of the same duplex mode (FDD+FDD intra-eNB CA or TDD+TDD intra-eNB CA) (see above FIG. 1B).

Figure 1C:
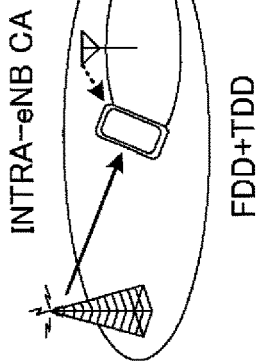
Figure 1B:
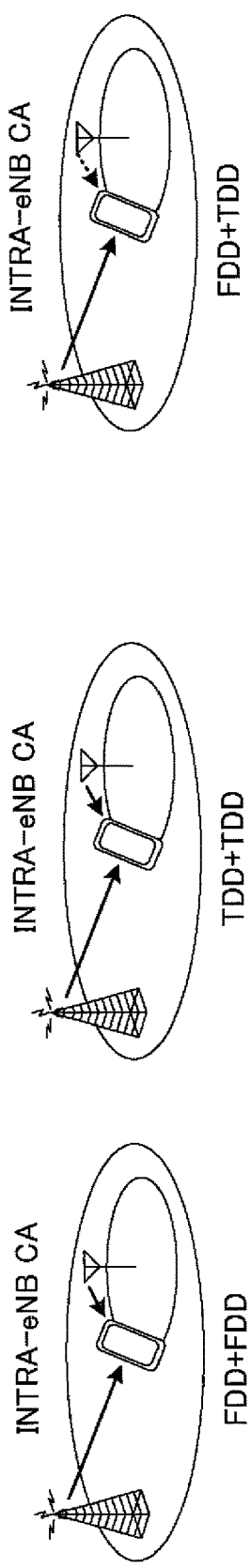

Meanwhile, the systems of Rel. 12 and later versions presume intra-base station CA (intra-eNB CA), which employs different duplex modes (TDD+FDD) between multiple CCs (see above FIG. 1C). Furthermore, the systems of Rel. 12 and later versions also presume employing inter-base station CA (inter-eNB CA) (see FIG. 2A). Note that inter-base station CA is preferably supported regardless of the duplex-mode, and it may be possible to introduce inter-base station CA which accommodates different duplex modes (TDD+FDD).

In intra-base station CA (intra-eNB CA), scheduling is controlled using one scheduler between multiple cells (see FIG. 2B). That is, a user terminal has only to feed back uplink control signals (UCI) such as delivery acknowledgement signals (ACKs/NACKs (hereinafter also referred to as "A/N's")), channel quality information (CQI), uplink (UL) scheduling requests (hereinafter also referred to as "SRs") and so on, to a specific cell (PCell) alone.

Meanwhile, in inter-base station CA (inter-eNB CA), schedulers are provided separately for each of multiple cells, and scheduling is controlled on a per cell basis. Also, inter-eNB CA presumes that each base station is connected in such a manner that the delay is not negligible (non-ideal backhaul connection). Consequently, a user terminal has to feed back uplink control signals (UCI) to each cell (see FIG. 2C).

When CA is executed by applying different duplex modes between multiple CCs (cells) (TDD–FDD CA), how a user terminal should send A/N feedback is the problem. For example, in inter-eNB CA, multiple CCs may each execute HARQ independently. In this case, it may also be possible to transmit A/N's from a cell that employs FDD (FDD cell) and from a cell that employs TDD simultaneously, in the same subframe.

On the other hand, in intra-eNB CA, (1) the case where multiple CCs each carry out HARQ independently as in inter-eNB CA, and (2) the case where A/N's for multiple CCs are multiplexed in one CC and transmitted, may occur. In the latter case of (2), the A/N's are gathered in one CC, so that there is no simultaneous transmission of A/N's. Furthermore, in intra-eNB CA, which feedback method a user terminal employs depends on the user terminal's capability (UE capability), the combination of the frequency bands used in each CC (band combination) and so on, and may be configured on the base station side and applied to the user terminal.

In above-described TDD–FDD CA, it may be possible to apply conventional feedback mechanism on an as-is basis. For example, when intra-eNB CA is executed by applying different duplex modes between multiple CCs (above (2)), A/N's for the multiple CCs are multiplexed upon the PCell's PUCCH and fed back. This case will be described below briefly.

FIG. 3A shows timings a user terminal feeds back ACKs/NACKs in response to PDSCH signals, in a cell in which FDD is employed (hereinafter also referred to as the "FDD cell"). In this case, the user terminal feeds back the A/N's in UL subframes that come a predetermined number of subframes (for example, 4 ms) after the DL subframes in which PDSCH signals are allocated.

FIG. 3B shows timings a user terminal feeds back ACKs/NACKs in response to PDSCH signals in a cell to employ TDD (hereinafter also referred to as the "TDD cell"). In this case, the user terminal feeds back the A/N's in UL subframes that are assigned in advance to the DL subframes in which PDSCH signals are allocated.

In TDD up to the Rel. 11 system, the configuration ratio of UL and DL has had a plurality of patterns (DL/UL configurations 0 to 6), and, in each DL/UL configuration, the DL subframes to be allocated to UL subframes are determined. For example, FIG. 3B shows the case of DL/UL configuration 2 (DL/UL Config. 2), in which each DL subframe is allocated to (associated with) a predetermined UL subframe. In FIG. 3B, the number that is assigned to each DL subframe (including special subframes) shows the number of subframes from the corresponding UL subframe.

In conventional systems, the timing to feed back A/N's (DL HARQ timing) stays the same even when CA is employed. However, even when CA is applied to UL, A/N transmission using the PUCCH is stipulated to be carried out only in a specific cell (PCell).

The present inventors have found out that, in CA to apply different duplex modes between multiple CCs (TDD–FDD CA), cases might occur where sending A/N feedback and so on by using the PCell's PUCCH alone results in limiting the UL subframes to use for feedback. For example, when the TDD cell serves as the PCell and the FDD cell serves as the SCell, there is a threat that adequate UL transmission of delivery acknowledgement signals and so on is not possible.

Figure 4A:
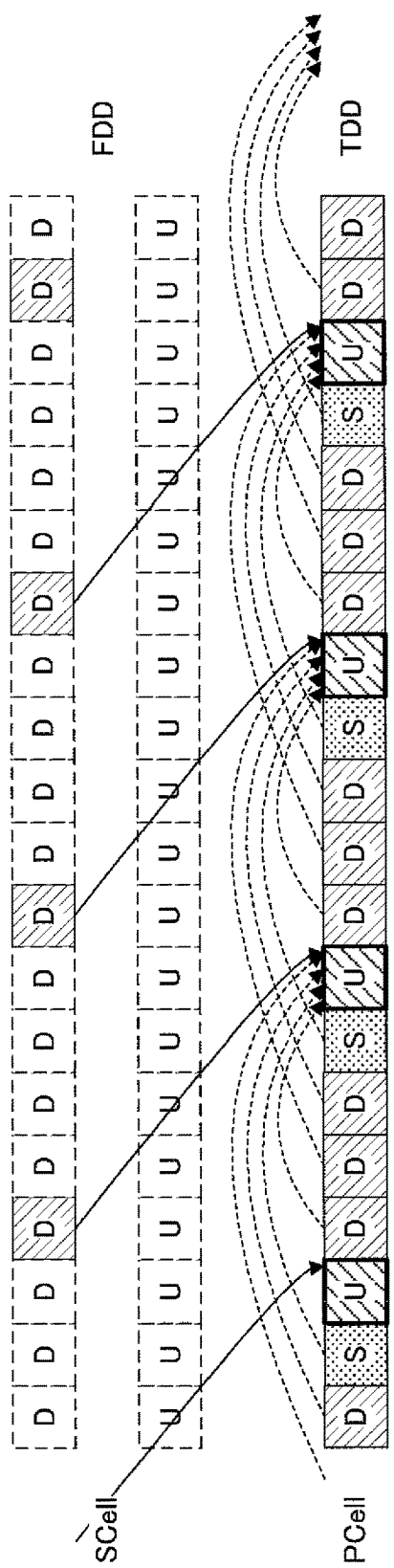
FIG. 4 provides diagrams to explain the feedback timings when existing A/N feedback timings are employed in TDD–FDD CA.

FIG. 4A shows a feedback method in which, when the TDD cell serves as the PCell and the FDD cell serves as the SCell, the DL HARQ timings of the SCell (FDD cell) are coordinated with the above FDD cell's timings (FIG. 3A). In this case, UL subframes for A/N feedback cannot be allocated to many of the DL subframes of the SCell (FDD cell). That is, A/N's in response to the PDSCH signal that is transmitted in each DL subframe cannot be fed back. Furthermore, despite the fact that there are vacant UL subframe resources in the SCell (FDD cell), these cannot be used for the PUCCH.

Figure 4B:
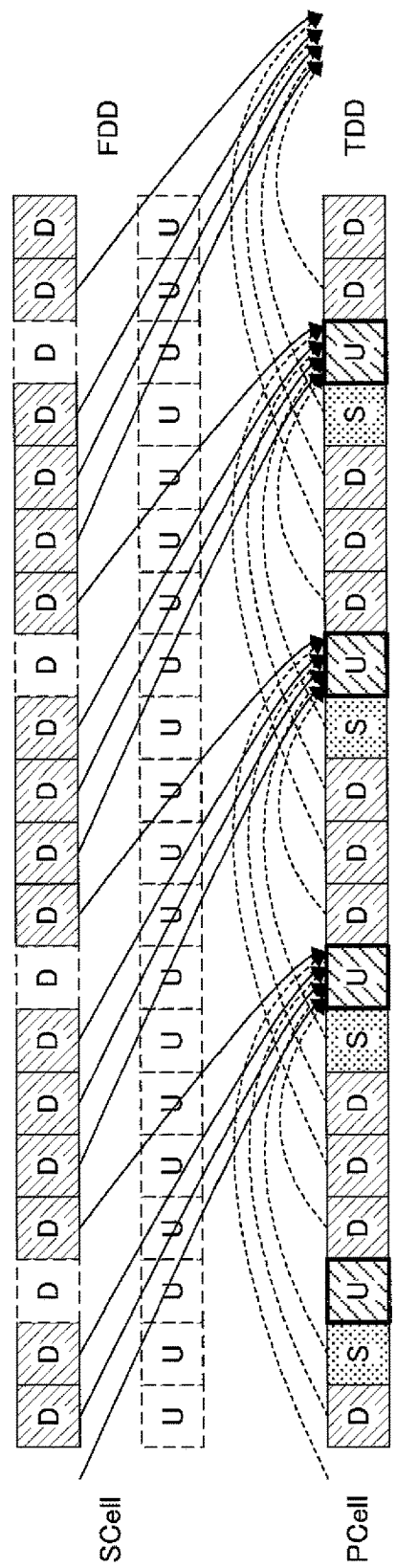

FIG. 4B shows a feedback method in which, when the TDD cell serves as the PCell and the FDD cell serves as the SCell, the DL HARQ timings of the SCell (FDD cell) are coordinated with the above TDD cell's timings (FIG. 3B). In this case, compared to FIG. 4A, the number of DL subframes of the SCell (FDD cell) where UL subframes for A/N feedback, which are subframes of the PCell (TDD cell), can be allocated increases. However, since the FDD cell's feedback timings (for example, 4 ms) change, there is a risk that complex control is required, compared to heretofore. Also, even when there are vacant UL subframe resources in the SCell (FDD cell), these cannot be used for the PUCCH.

The present inventors have found out that, when TDD–FDD CA is employed (in particular, when the TDD cell serves as the PCell and the FDD cell serves as the SCell), it becomes possible to adequately allocate UL subframes to each DL subframe of the PCell and the SCell, by supporting UL transmission using the PUCCH (PUCCH transmission) in the SCell's UL.

Figure 5:
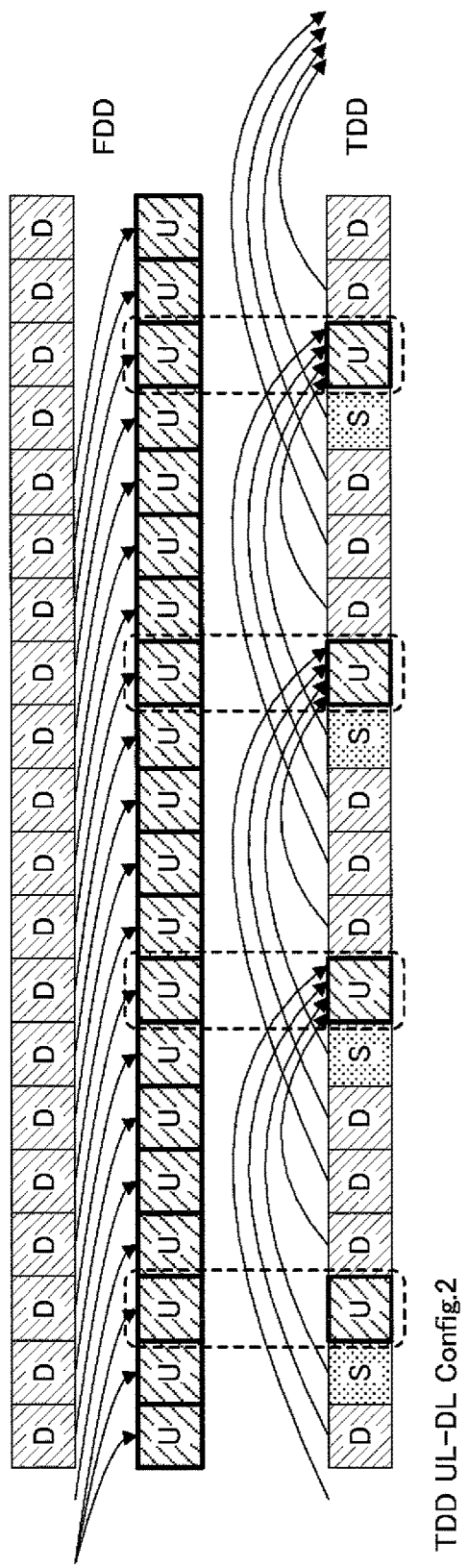
FIG. 5 is a diagram to show an example of the A/N feedback method according to the present embodiment in TDD–FDD CA.

To be more specific, in intra-eNB CA, regardless of which of the FDD cell and the TDD cell serves as the PCell, if UL subframes are configured in the FDD cell alone, delivery acknowledgement signals and so on are fed back (PUCCH transmission) using these UL subframes of the FDD cell. Also, when a UL subframe is configured in both the FDD cell and the TDD cell (when the TDD cell's UL subframes are configured), the present inventors have come up with the idea of feeding back delivery acknowledgement signals by using the UL subframe of one or both of the TDD cell and the FDD cell (see FIG. 5).

That is, in intra-eNB CA, in subframes other than the subframes where the FDD cell and the TDD cell are both directed to UL, A/N-related PUCCH transmission is carried out by using the FDD cell's UL subframes. To be more specific, among the FDD cell's DL subframes, A/N's in response to DL subframes apart from the DL subframes that are four subframes before UL subframes of the TDD cell are fed back using the FDD cell's UL subframes. By this means, regardless of which of the FDD cell and the TDD cell is the PCell, FDD UL subframe resources are utilized effectively. Also, in subframes in which the FDD cell and the TDD cell are both directed to UL, the A/N feedback method (feedback target and so on) is controlled.

Meanwhile, in UL subframes, besides delivery acknowledgement signals (A/N's), channel quality information (CQI), scheduling requests and so on are transmitted. CQIs and scheduling requests such as these are transmitted in accordance with one of the following examples. In a timing to transmit the PUSCH, (1) a CQI and a scheduling request are both multiplexed and transmitted on the PUSCH, or (2) the CQI is multiplexed and transmitted on the PUSCH, while the scheduling requests is multiplexed and transmitted on the PUCCH. Also, even in timings not to transmit the PUSCH, cases might occur where a CQI and a scheduling request are both multiplexed and transmitted on the PUCCH.

Note that the PUCCH to transmit a scheduling request alone is referred to as the "PUCCH format 1," and the PUCCH to transmit a CQI alone is referred to as the "PUCCH format 2." Then, the transmission UL subframes, the transmission cycles and the transmission resources are configured by RRC signaling. Also, when a user terminal transmits a delivery acknowledgement signal in a PUCCH format 1 or PUCCH format 2 transmission timing, cases might occur where the delivery acknowledgement signal is multiplexed with a scheduling request or a CQI on the PUCCH format 1 or the PUCCH format 2. For example, a user terminal that is configured to multiplex CQIs and delivery acknowledgement signals transmits CQIs in the PUCCH format 2 in subframes where no delivery acknowledgement signal is transmitted. On the other hand, in subframes in which a delivery acknowledgement signal and a CQI are transmitted simultaneously, the user terminal multiplexes and transmits the CQI and the delivery acknowledgement signal in the resource of the PUCCH format 2. The PUCCH on which a CQI and a delivery acknowledgement signal are multiplexed is referred to as the "PUCCH format 2a/2b." The PUCCH format 2a is a PUCCH format 2 in which a one-bit delivery acknowledgement signal is multiplexed with a CQI, and the PUCCH format 2b is a PUCCH format 2 in which a two-bit delivery acknowledgement signal is multiplexed with a CQI. Note that, in subframes in which no CQI is transmitted, the user terminal transmits delivery acknowledgement signals, when a need arises, by using the PUCCH format 1a/1b. Furthermore, similar to CQIs, a scheduling request may also be multiplexed with a delivery acknowledgement signal, and the transmission resource and the cycle are configured by RRC signaling.

In this way, while delivery acknowledgement signals are produced in specific UL subframe timings every time data is received, CQIs and scheduling requests are transmitted in periodically-configured UL subframe timings. Consequently, when TDD-FDD CA is employed and PUCCH transmission is supported in UL of both the PCell and the SCell, how to transmit CQIs and scheduling requests is the problem.

So, the present inventors have found out that, if a UL subframe is configured in both the FDD cell and the TDD cell in intra-eNB CA, it is possible to transmit an A/N in either one or both of the UL subframes, and also control whether or not to transmit a CQI and a scheduling request having overlapping transmission timings with the A/N, thereby enabling adequate UL transmission of CQIs, scheduling requests and so on.

To be more specific, assuming a case where a UL subframe is configured in both the FDD cell and the TDD cell in intra-eNB CA, the present inventors have come up with an example to prioritize one cell that transmits an A/N, and drop the transmission of a CQI, a scheduling request and so on in the other cell (first example), and an example to prioritize one cell that transmits a CQI, a scheduling request and so on, and multiplex and transmit the other cell's A/N on the PUCCH of the first cell (second example).

Now, based on these first and second examples, the transmission control method for controlling whether or not to transmit a CQI and a scheduling request having overlapping transmission timings with an A/N will be described in detail below. Note that, although cases to use DL/UL configuration 2 in the TDD cell will be shown as examples in the following description, the DL/UL configuration that is applicable to the present embodiment is by no means limited to this. Also, although cases in which the TDD cell is the PCell and the FDD cell is the SCell will be shown in the following description, the present embodiment is equally applicable to cases where these cells are configured to the contrary.

First Example

Assuming a case where a UL subframe is configured in both the FDD cell and the TDD cell in intra-eNB CA, a method to prioritize one cell that transmits an A/N, and drop the transmission of a CQI, a scheduling request and so on in the other cell will be described with a first example.

Note that, in the following description, CQIs will be used as an example of signals that have overlapping transmission timings with A/N's, for ease of explanation. However, scheduling requests may be added to these CQIs as signals to have overlapping transmission timings with A/N's, and it is equally possible to replace CQIs with scheduling requests.

FIG. 6 provides diagrams to explain examples of the transmission control method according to the first example in TDD-FDD CA. FIG. 6A shows a case where CQI transmission timings are configured not to coincide between the PCell and the SCell. FIG. 6B shows a case where CQI transmission timings are configured to coincide between the PCell and the SCell. Note that, in FIG. 6, the FDD cell's DL subframes are omitted for ease of explanation. Also, in FIG.

6, the subframes to transmit A/N's are shown as "A/N SF," and index numbers (#1 to #8) are assigned for ease of explanation.

As shown in FIG. 6, the first example is characteristic in that CQIs are configured not only in the PCell, but also in the SCell as well. Assume that the cell where CQIs are configured is determined in advance by RRC and other higher layers, together with the transmission cycle, PUCCH resources and so on. A CQI that is configured in a given cell may be this cell's CQI, or may be another cell's CQI. CQI transmission, which heretofore has been configured only in the PCell, is configured in the SCell as well, so that CQI transmission can be carried out in a more flexible manner. Also, the cycle of CQI transmission can be changed on a per cell basis, so that it is possible to introduce a bias in the frequency to transmit CQIs between the PCell and the SCell, and introduce a bias in the reliability of CQIs achieved with the scheduler.

The transmission control method according to the first example may roughly be applied to the case where the FDD cell and the TDD cell do not transmit the PUCCH at the same time, and the case where the FDD cell and the TDD cell transmit the PUCCH at the same time. The same holds with the transmission control method according to a second example, which will be described later. The case where PUCCH transmission is carried out in the FDD cell and in the TDD cell at the same time and the case where PUCCH transmission is not carried out in the FDD cell and in the TDD cell at the same time will be described below separately.

(Case where PUCCH Transmission is not Carried Out in the FDD Cell and in the TDD Cell at the Same Time)

When CQI transmission timings are configured not to coincide between the TDD cell and the FDD cell, the transmission of CQIs is controlled as follows. When the transmission timings of an A/N and a CQI overlap in the FDD cell or in the TDD cell, the CQI is multiplexed on the PUCCH of the cell that transmits the A/N and transmitted (see A/N SFs #3 and #4). For example, when the transmission timings of an A/N and a CQI overlap in the FDD cell, the CQI is multiplexed on the PUCCH of the FDD cell, which transmits the A/N, and transmitted (A/N SF #3). Also, when the transmission timings of an A/N and a CQI overlap in the TDD cell, the CQI is multiplexed on the PUCCH of the TDD cell, which transmits the A/N, and transmitted (A/N SF #4).

Also, when the transmission timings of an A/N and a CQI overlap between the FDD cell and the TDD cell, the transmission of the CQI is dropped (see A/N SFs #1 and #2). For example, when, in the same subframe, a CQI is planned to be transmitted in the FDD cell while an A/N is planned to be transmitted in the TDD cell, the transmission of the CQI in the FDD cell is dropped (A/N SF #1). Also, when, in the same subframe, a CQI is planned to be transmitted in the TDD cell while an A/N is planned to be transmitted in the FDD cell, the transmission of the CQI in the TDD cell is dropped (A/N SF #2).

When CQI transmission timings are configured to coincide between the TDD cell and the FDD cell, the transmission of CQIs is controlled as follows. When the transmission timing of an A/N overlaps a CQI (in other words, when there is a need to transmit an A/N in a CQI transmission timing in the TDD cell and the FDD cell), in the cell to transmit the A/N, the CQI is multiplexed on the PUCCH and transmitted, while the transmission of the CQI of the cell not transmitting the A/N is dropped (A/N SFs #5 to #8). For example, when a CQI is planned to be transmitted in both the TDD cell and the FDD cell, and, furthermore, an A/N is planned to be transmitted in the TDD cell alone, in the TDD cell to transmit the A/N, the CQI is multiplexed on the PUCCH and transmitted, while the transmission of the FDD cell's CQI is dropped (A/N SFs #5 and #8). Also, when a CQI is planned to be transmitted in both the TDD cell and the FDD cell, and, furthermore, an A/N is planned to be transmitted in the FDD cell alone, in the FDD cell to transmit the A/N, the CQI is multiplexed on the PUCCH and transmitted, while the transmission of the TDD cell's CQI is dropped (A/N SFs #6 and #7).

Meanwhile, when the transmission timing of an A/N does not overlap a CQI (in other words, when there is no need to transmit an A/N at a CQI transmission timing in the TDD cell and the FDD cell), the CQI of the PCell (TDD cell) is multiplexed on the PUCCH and transmitted, while the transmission of the CQI of the SCell (FDD cell) is dropped. For example, assuming a case where no A/N is transmitted as in A/N SF #8 shown in FIG. 6B, only the transmission timings of CQIs in the TDD cell and the FDD cell overlap in this UL subframe. In this case, with the transmission control method according to the first example, the CQI of the PCell (TDD cell) is multiplexed and transmitted on the PUCCH, while the transmission of the CQI of the SCell (FDD cell) is dropped.

Note that a case is described here where a CQI is multiplexed on the PUCCH of the PCell (TDD cell) and transmitted (PUCCH transmission). However, when, instead of carrying out PUCCH transmission in the PCell (TDD cell), PUCCH transmission is carried out in a plurality of SCells, it is possible to multiplex and transmit a CQI on the PUCCH of a cell having a small SCell index.

Thus, according to the transmission control method of the first example, it is possible to support CQI transmission not only in the PCell (TDD cell), but also in the SCell (FDD cell) as well. Consequently, when, for example, there are many A/N's of the SCell (FDD cell), the TDD cell is the PCell and so on, it is still possible to prevent the situation where CQI transmission is dropped in the SCell (FDD cell). By this means, it is possible to secure the number of CQIs which the base stations can reference when executing scheduling. As a result of this, it is possible to improve the reliability of scheduling in the base stations.

Also, a CQI to be transmitted in the same timing as an A/N in the same cell is multiplexed on the PUCCH to transmit the A/N and transmitted. Consequently, the base stations can learn channel state information (CSI) pertaining to user terminals in a timely and reliable manner. By this means, it is possible to improve the reliability of scheduling in the base stations.

In particular, a CQI of a cell transmitting an A/N is transmitted preferentially over a CQI of a cell not transmitting an A/N (see A/N SFs #5 to #8 shown in FIG. 6B). Generally, A/N's are communicated more frequently in a cell (CC) where the volume of traffic is heavier. Consequently, the base stations can learn more accurate CQIs in cells where the volume of traffic is heavier.

Furthermore, a scheduling request to be transmitted in the same timing as an A/N is multiplexed on the PUCCH to transmit the A/N, and transmitted. Consequently, the base stations can execute timely UL scheduling that meets requests from user terminals.

Furthermore, regardless of whether or not there is an A/N to transmit, a CQI can be transmitted in the SCell. Consequently, compared to the case where the transmission of CQIs is limited to the PCell as has been so heretofore, it is possible to distribute and allocate PUCCHs to the PCell and the SCell so that resources do not run short.

When the transmission timings of CQIs overlap between the TDD cell and the FDD cell and yet there is no A/N to transmit, the CQI of the cell of the higher priority (which may be, for example, the PCell, or a cell having a smaller SCell index) is transmitted, while the CQI transmission in the cell having the lower priority (which may be, for example, the SCell, or a cell having a larger SCell index) is dropped. By executing such control, it is possible to maintain the compatibility with the operation of CA in Rel. 10 (that is, intra-base station CA (intra-eNB CA)).

(Case where PUCCH transmission is carried out in the FDD cell and in the TDD cell at the same time)

When the transmission timings of an A/N and a CQI overlap in one or both of the FDD cell and the TDD cell, the A/N and the CQI are multiplexed on each cell's PUCCH. For example, when the transmission timings of an A/N and a CQI overlap in the FDD cell, these are multiplexed on the same PUCCH and transmitted. Meanwhile, when the transmission timing of an A/N in the FDD cell and the transmission timing of a CQI in the TDD cell overlap, the A/N is multiplexed on the FDD cell's PUCCH, while the CQI is multiplexed on the TDD cell's PUCCH and transmitted.

In this way, according to the transmission control method of the first example, when the transmission timings of an A/N and a CQI (scheduling request) overlap in one or both of the FDD cell and the TDD cell, the A/N and the CQI (scheduling request) are multiplexed on each cell's PUCCH and transmitted. Consequently, it is possible to transmit A/N's and CQIs (scheduling requests), which become necessary to feed back over the course of communication, to both the FDD cell and the TDD cell, without loss. By this means, it is possible to improve the reliability of scheduling and so on in the base stations of both the FDD cell and the TDD cell.

Also, the transmission control to multiplex and transmit an A/N and a CQI (scheduling request) over each cell's PUCCH may be applied to A/N and CQI feedback in inter-eNB CA. Consequently, a user terminal can support both intra-eNB CA and inter-eNB CA with one function. By this means, it is possible to supply user terminals at low costs, without making the radio (RF) circuit and the baseband circuit complex.

Second Example

Assuming a case where a UL subframe is configured in both the FDD cell and the TDD cell in intra-eNB CA, a method to prioritize one cell that transmits a CQI, a scheduling request and so on, and multiplex and transmit an A/N of the other cell on the first cell's PUCCH will be described with a second example.

FIG. 7 provides diagrams to explain examples of the transmission control method according to the second example, in TDD-FDD CA. FIG. 7A shows a case where CQI transmission timings are configured not to coincide between the PCell and the SCell. FIG. 7B shows a case where CQI transmission timings are configured to coincide between the PCell and the SCell. Note that, in FIG. 7, the FDD cell's DL subframes are omitted for ease of explanation. Also, in FIG. 7, the subframes to transmit A/N's are shown as "A/N SF," and index numbers (#11 to 14) are assigned for ease of explanation. Also, in FIG. 7, the subframes to transmit CQIs alone are shown as "CQI SF," and index numbers (#15 to #18) are assigned for ease of explanation.

(Case where PUCCH Transmission is not Carried Out in the FDD Cell and in the TDD Cell at the Same Time)

When CQI transmission timings are configured not to coincide between the TDD cell and the FDD cell, the transmission of CQIs is controlled as follows. When the transmission timing of an A/N in the FDD cell or the TDD cell and the transmission timing of a CQI in the FDD cell or the TDD cell overlap, the A/N is multiplexed and transmitted on the PUCCH of the cell that transmits the CQI. For example, when the transmission timing of a CQI in the FDD cell and the transmission timing of an A/N in the TDD cell overlap, the A/N is multiplexed and transmitted on the FDD cell's PUCCH (see A/N SF #11). In this case, the A/N is not transmitted from the TDD cell. Similarly, when the transmission timing of an A/N in the FDD cell and the transmission timing of a CQI in the TDD cell overlap, the A/N is multiplexed and transmitted on the TDD cell's PUCCH (see A/N SF #12).

Note that, when a CQI is planned to be transmitted only in one of the FDD cell and the TDD cell, this CQI alone is multiplexed on the PUCCH of that cell and transmitted. For example, when a CQI is planned to be transmitted in the FDD cell and no A/N transmission is planned in the same subframe, this CQI alone is multiplexed on the FDD cell's PUCCH and transmitted (see CQI SF #15). On the other hand, when a CQI is planned to be transmitted in the TDD cell and no A/N transmission is planned in the same subframe, this CQI alone is multiplexed on the TDD cell's PUCCH and transmitted (see CQI SF #16).

When CQI transmission timings are configured to coincide between the TDD cell and the FDD cell, the transmission of CQIs is controlled as follows. When the transmission timing of an A/N overlaps a CQI (in other words, when a need to transmit an A/N at a CQI transmission timing in the TDD cell and the FDD cell arises), in the TDD cell, which is the PCell, the A/N is multiplexed and transmitted with the CQI on the PUCCH, while the transmission of the other cell's CQI is dropped (see A/N SFs #13 and #14).

Note that a case is described here where an A/N and a CQI are multiplexed on the PUCCH of the PCell (TDD cell) and transmitted (PUCCH transmission). However, when, instead of carrying out PUCCH transmission in the PCell (TDD cell), PUCCH transmission is carried out in a plurality of SCells, it is possible to multiplex and transmit an A/N and a CQI on the PUCCH of a cell having a small SCell index.

On the other hand, when the transmission timing of an A/N does not overlap a CQI (in other words, when there is need to transmit an A/N at a CQI transmission timing in the TDD cell and FDD cell), in the PCell (TDD cell), the CQI is multiplexed on the PUCCH and transmitted, while the transmission of the CQI of the SCell (FDD cell) is dropped. For example, as shown with CQI SFs #17 and #18 illustrated in FIG. 7B, when the transmission timings of CQIs overlap between the TDD cell and the FDD cell, the CQI of the PCell (TDD cell) is multiplexed and transmitted on the PUCCH, while the transmission of the CQI of the SCell (FDD cell) is dropped.

Thus, according to the transmission control method of the second example, as in the first example, it is possible to support CQI transmission not only in the PCell (TDD cell), but also in the SCell (FDD cell) as well. Consequently, when, for example, there are many A/N's of the SCell (FDD cell), the TDD cell is the PCell and so on, it is still possible to prevent the situation where CQI transmission is dropped in the SCell (FDD cell). By this means, it is possible to secure the number of CQIs which the base stations can reference when executing scheduling. As a result of this, it is possible to improve the reliability of scheduling in the base stations.

Also, an A/N is multiplexed and transmitted on the PUCCH with a CQI to be transmitted at the same timing in the PCell (a cell having a small SCell index). Consequently, the base stations can learn channel state information (CSI) pertaining to user terminals in a timely and reliable manner. By this means, it is possible to improve the reliability of scheduling in the base stations.

In particular, a CQI of the PCell (a cell having a small SCell index) is transmitted preferentially over a CQI of the SCell (a cell having large SCell index) (see A/N SFs #13 and #14 and CQI SFs #17 and #18 shown in FIG. 7B). Generally, the PCell (a cell having a small SCell index) is configured as a cell where it is important to secure quality. Consequently, the base stations can learn more accurate CQIs in cells where it is more important to secure quality.

Furthermore, an A/N is multiplexed and transmitted on the PUCCH with a scheduling request to be transmitted at the same timing. Consequently, the base stations can execute timely UL scheduling that meets requests from user terminals.

Furthermore, regardless of whether or not there is an A/N to transmit, a CQI can be transmitted in the SCell. Consequently, compared to the case where the transmission of CQIs is limited to the PCell as has been so heretofore, it is possible to reduce the load in the base station of the PCell.

When the transmission timings of CQIs overlap between the TDD cell and the FDD cell and yet there is no A/N to transmit, the CQI of the cell of the higher priority (which may be, for example, the PCell, or a cell having a smaller SCell index) is transmitted, while the CQI transmission in the cell having the lower priority (which may be, for example, the SCell, or a cell having a larger SCell index) is dropped. By executing such control, it is possible to maintain the compatibility with the operation of CA in Rel. 10 (that is, intra-base station CA (intra-eNB CA)).

(Case where PUCCH Transmission is Carried Out in the FDD Cell and in the TDD Cell at the Same Time)

When the transmission timings of an A/N and a CQI overlap in one or both of the FDD cell and the TDD cell, the A/N and the CQI are multiplexed on each cell's PUCCH. For example, when the transmission timings of an A/N and a CQI overlap in the FDD cell, these are multiplexed on the same PUCCH and transmitted. Meanwhile, when the transmission timing of an A/N in the FDD cell and the transmission timing of a CQI in the TDD cell overlap, the A/N is multiplexed on the FDD cell's PUCCH, while the CQI is multiplexed on the TDD cell's PUCCH and transmitted.

In this way, according to the transmission control method of the second example, similar to the first example, when the transmission timings of an A/N and a CQI (scheduling request) overlap in one or both of the FDD cell and the TDD cell, the A/N and the CQI (scheduling request) are multiplexed on each cell's PUCCH and transmitted. Consequently, it is possible to transmit A/N's and CQIs (scheduling requests), which become necessary to feed back over the course of communication, to both the FDD cell and the TDD cell, without loss. By this means, it is possible to improve the reliability of scheduling and so on in the base stations of both the FDD cell and the TDD cell.

Also, the transmission control to multiplex and transmit an A/N and a CQI (scheduling request) over each cell's PUCCH may be applied to A/N and CQI feedback in inter-eNB CA. Consequently, a user terminal can support both intra-eNB CA and inter-eNB CA with one function. By this means, it is possible to supply user terminals at low costs, without making the radio (RF) circuit and the baseband circuit complex.

<Base Station-UE Reporting Method>

Note that, in timings where a UL subframe is configured in both the FDD cell and the TDD cell, the base stations can report in which cell's UL subframe PUCCH transmission is carried out, to user terminals, by using downlink control information (DCI), higher layer signaling (for example, RRC signaling) and so on. For example, the base stations can report information about the cells to user terminals by using unused bits in existing DCI or bits that relate to PUCCH resources. Now, the method of reporting from the base stations to user terminals will be described below.

The base stations can specify the cell to perform PUCCH transmission by using the TPC command field (also referred to as "ARI") that is contained in the SCell's DCI. The ARI is an ACK/NACK resource indicator (A/N resource indicator) that was introduced in Rel. 10, and that is used to specify the PCell's PUCCH resource that is used to send A/N feedback for the PDSCH transmitted from the SCell when CA is employed. A plurality of PUCCH resource candidates are reported to a user terminal in advance through higher layers such as RRC, and one among these is specified by the ARI.

The ARI introduced in Rel. 10 can only specify PUCCH resources within the PCell. So, the present embodiment is structured so that a plurality of PUCCH resource candidates can be configured, over the PCell and the SCell, by using ARIs. A user terminal selects the CC to carry out PUCCH transmission and the PUCCH resource, by using ARIs reported from the base stations.

In this way, by selecting the feedback target cell (the cell where A/N's are gathered) by using the ARI in timings where the FDD cell and the TDD cell are both directed to UL, it is possible to control PUCCH transmission dynamically and flexibly. By this means, it is possible to disperse PUCCH transmission to each cell (for example, the TDD cell), and achieve an off-loading effect. Furthermore, by carrying out transmission power control (TPC) for the PUCCH signal based on TPC commands contained in the PCell's DCI and selecting the CC and resource to carry out PUCCH transmission by using the SCell's TPC commands, it is possible to prevent the increase of overhead.

Furthermore, the base stations can specify the cell to carry out PUCCH transmission by using the bit field (also referred to as "ARO") that is contained in DCI transmitted in the enhanced PDCCH (EPDCCH), and that applies an offset to the PUCCH resource index (ECCE index). The ARO was introduced in Rel. 11, and specifies the offset value to add to the enhanced control channel element index (ECCE index) when determining the PUCCH resource to use in A/N feedback for the PDSCH that is modulated using the EPDCCH. The enhanced PDCCH (EPDCCH) is a downlink control channel that is allocated to be frequency-division-multiplexed with the PDSCH (downlink shared data channel).

The ARO that was introduced in Rel. 11 does not take into account application of CA (non-CA), and therefore is not used (zero-fixed) when CA is employed. So, with the present embodiment, the cell (the PCell or the SCell) to carry out PUCCH transmission is specified by using the ARO. A user terminal selects the CC to carry out PUCCH transmission based on the ARO reported.

In this way, it is possible to control PUCCH transmission dynamically and flexibly by selecting the feedback target cell (the cell where A/N's are gathered) by using the ARO, in timings where the FDD cell and the TDD cell are both directed to UL. By this means, it is possible to disperse PUCCH transmission to each cell, and achieve an off-loading effect.

Also, when transmitting DCI in the EPDCCH, the base stations can combine and apply the above-described ARI of the SCell and the ARO, and report the feedback target cell and the PUCCH resource to the user terminal. For example, the base stations specify the CC to carry out PUCCH transmission with the ARO, specify the PUCCH resource in this CC with the ARI, and report these to the user terminal. In this case, each specified CC may be configured with a different PUCCH resource candidate set. In this way, by using the ARI and the ARO, it becomes possible to make effective use of unused bits, and, furthermore, execute PUCCH transmission control and off-loading in a flexible manner.

Also, the base stations may indicate information related to the cell to carry out PUCCH transmission in timings where the FDD cell and the TDD cell are both directed to UL, by using the resource and configuration (Config) of the control channel (PDCCH/EPDCCH) that transmits downlink control information (DCI).

For example, the base stations can associate each cell with a search space type (common-SS or UE-specific-SS) and indicate these to the user terminal. For example, PUCCH transmission is carried out in the PCell in the event of a common search space (C-SS), and carried out in the SCell in the event of a user-specific search space (UE-SS).

Alternatively, the base stations can associate each cell with a control channel type (PDCCH or EPDCCH) and indicate these to the user terminal. For example, PUCCH transmission is carried out in the PCell in the event of the PDCCH, and carried out in the SCell in the event of the EPDCCH.

Alternatively, the base stations can associate each cell with a location in the PDCCH/EPDCCH where downlink control information (DCI) is scheduled (CCE index), and indicate these to the user terminal. For example, PUCCH signal transmission is carried out in the PCell when DCI is mapped to CCE/ECCE indices 0 to 30 in the PDCCH/EPDCCH, and carried out in the SCell otherwise.

In this way, by associating cell information with search space types, control channel types, PDCCH/EPDCCH locations and so on, it is possible to specify the CC to carry out PUCCH transmission based on the scheduling of DCI. By this means, it is possible to prevent the increase of overhead. Furthermore, it may be possible to carry out PUCCH transmission in the SCell, for example, only when the UE-SS and the EPDCCH are used, and carry out PUCCH transmission in the PCell otherwise, including when, for example, the C-SS and the PDCCH are used. By this means, even when the re-configuration of UE-specific RRC parameters is in progress, it is still possible to continue communication (fallback), without disconnection, by using the C-SS and the PDCCH.

(Variation)

Note that, although cases have been shown in the above description where the feedback timings for when CA is not employed are used as HARQ timings in response to the allocation of DL signals (PDSCH signals) of each of the FDD cell and the TDD cell, the present embodiment is by no means limited to this. For example, it is equally possible to make the DL HARQ timings in the TDD cell the same as the DL HARQ timings in FDD, in intra-eNB CA (see FIG. 13). In this case, an A/N in response to the PDSCH signal that is transmitted in each DL subframe of the TDD cell can be fed back in the FDD cell's UL subframe that comes a predetermined period (for example, 4 ms) after the subframe in which the PDSCH signal is transmitted. By this means, it is possible to reduce the feedback delay in TDD DL HARQ to 4 ms. Also, since it is possible to reduce the number of delivery acknowledgement signals to feed back in one UL subframe and disperse these signals over a plurality of subframes, even when a base station fails to detect a delivery acknowledgement signal, it is still possible to reduce the impact this has on DL HARQ.

Figure 13:
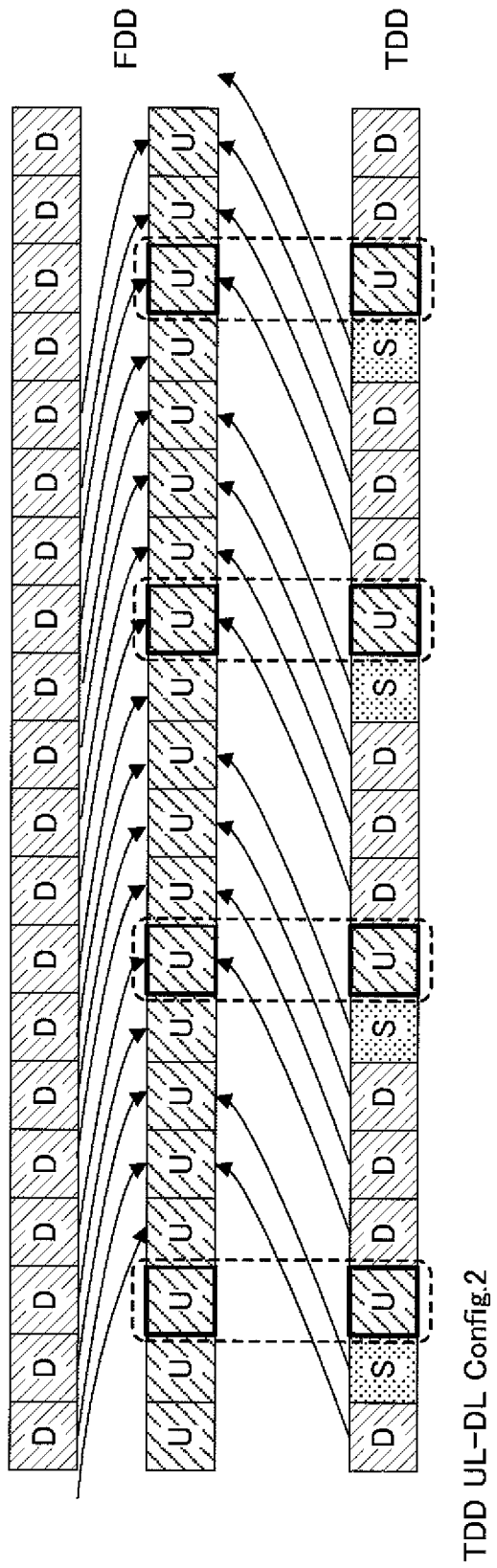
FIG. 13 is a diagram to explain another example of DL HARQ timings applicable to the present embodiment in TDD–FDD CA.

Meanwhile, in the case illustrated in FIG. 13, in timings (TDD cell's UL subframes) where the FDD cell and the TDD cell are both directed to UL, in which CC the A/N's should be multiplexed and PUCCH transmission should be carried out is the problem. In this case, it is possible to select the cell to carry out PUCCH transmission by using the above-described first example or second example. for example, in FIG. 13, cases might occur in subframes in which both the FDD cell and the TDD cell are directed to UL, including the case where PUCCH transmission is carried out only in one cell (the FDD cell or the TDD cell) regardless of the configuration of the primary cell, the case where PUCCH transmission is carried out in the PCell, the case where A/N's are transmitted in these subframes, and so on.

(Structure of Radio Communication System)

Now, an example of a radio communication system according to the present embodiment will be described in detail below.

Figure 8:
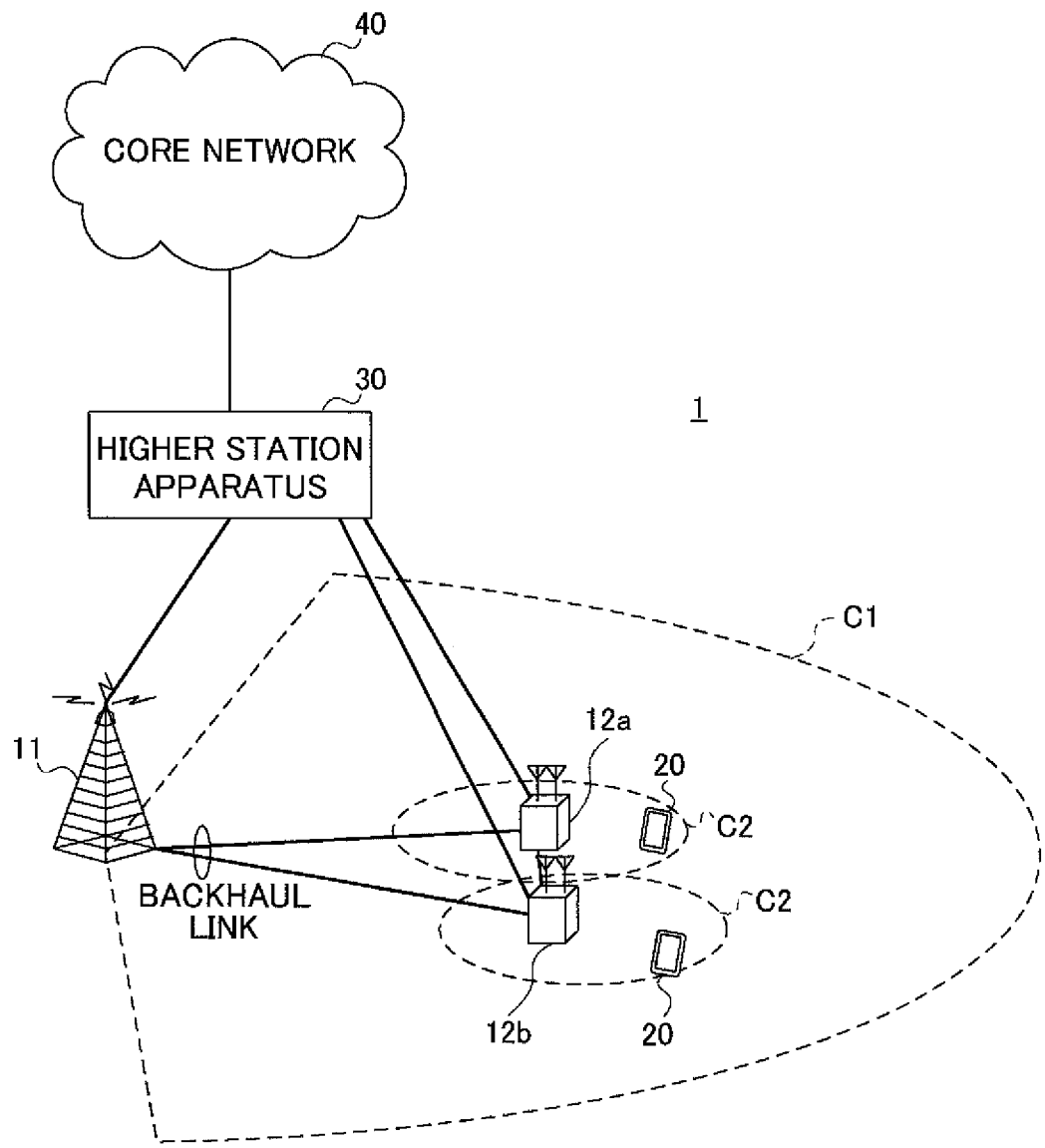
FIG. 8 is a schematic diagram to show an example of a radio communication system according to the present embodiment.

FIG. 8 is a schematic structure diagram of the radio communication system according to the present embodiment. Note that the radio communication system shown in FIG. 13 is a system to incorporate, for example, the LTE system or SUPER 3G. This radio communication system can adopt carrier aggregation (CA) to group a plurality of fundamental frequency blocks (component carriers) into one, where the system bandwidth of the LTE system constitutes one unit. Also, this radio communication system may be referred to as "IMT-advanced," or may be referred to as "4G," "FRA (Future Radio Access)," etc.

The radio communication system 1 shown in FIG. 8 includes a radio base station 11 that forms a macro cell C1, and radio base stations 12a and 12b that are placed inside the macro cell C1 and form small cells C2, which are narrower than the macro cell C1. Also, user terminals 20 are placed in the macro cell C1 and in each small cell C2. The user terminals 20 can connect with both the radio base station 11 and the radio base stations 12 (dual connectivity). Also, intra-base station CA (intra-eNB CA) or inter-base station CA (inter-eNB CA) is applied between the radio base station 11 and the radio base stations 12.

Between the user terminals 20 and the radio base station 11, communication is carried out using a carrier of a relatively low frequency band (for example, 2 GHz) and a narrow bandwidth (referred to as, for example, "existing carrier," "legacy carrier" and so on). Meanwhile, between the user terminals 20 and the radio base stations 12, a carrier of a relatively high frequency band (for example, 3.5 GHz and so on) and a wide bandwidth may be used, or the same carrier as that used in the radio base station 11 may be used. A new carrier type (NCT) may be used as the carrier type between the user terminals 20 and the radio base stations 12. Between the radio base station 11 and the radio base stations 12 (or between the radio base stations 12), wire connection (optical fiber, X2 interface and so on) or wireless connection is established.

The radio base station 11 and the radio base stations 12 are each connected with a higher station apparatus 30, and are connected with a core network 40 via the higher station apparatus 30. Note that the higher station apparatus 30 may be, for example, an access gateway apparatus, a radio network controller (RNC), a mobility management entity (MME) and so on, but is by no means limited to these. Also, each radio base station 12 may be connected with the higher station apparatus via the radio base station 11.

Note that the radio base station 11 is a radio base station having a relatively wide coverage, and may be referred to as an "eNodeB," a "macro base station," a "transmitting/receiving point" and so on. Also, the radio base stations 12 are radio base stations having local coverages, and may be referred to as "small base stations," "pico base stations," "femto base stations," "home eNodeBs," "micro base stations," "transmitting/receiving points" and so on. Hereinafter the radio base stations 11 and 12 will be collectively referred to as "radio base station 10," unless specified otherwise. The user terminals 20 are terminals to support various communication schemes such as LTE, LTE-A and so on, and may be both mobile communication terminals and stationary communication terminals.

In this radio communication system, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single-carrier transmission scheme to mitigate interference between terminals by dividing the system band into bands formed with one or continuous resource blocks per terminal, and allowing a plurality of terminals to use mutually different bands.

Now, communication channels used in the radio communication system shown in FIG. 8 will be described. Downlink communication channels include a PDSCH (Physical Downlink Shared CHannel), which is used by each user terminal 20 on a shared basis, and downlink L1/L2 control channels (PDCCH, PCFICH, PHICH and enhanced PDCCH). User data and higher control information are transmitted by the PDSCH. Scheduling information for the PDSCH and the PUSCH and so on are transmitted by the PDCCH (Physical Downlink Control CHannel). The number of OFDM symbols to use for the PDCCH is transmitted by the PCFICH (Physical Control Format Indicator Channel). HARQ ACKs/NACKs for the PUSCH are transmitted by the PHICH (Physical Hybrid-ARQ Indicator CHannel). Also, the scheduling information for the PDSCH and the PUSCH and so on may be transmitted by the enhanced PDCCH (EPDCCH) as well. This EPDCCH is frequency-division-multiplexed with the PDSCH (downlink shared data channel).

Uplink communication channels include a PUSCH (Physical Uplink Shared CHannel), which is used by each user terminal 20 on a shared basis as an uplink data channel, and a PUCCH (Physical Uplink Control CHannel), which is an uplink control channel. User data and higher control information are transmitted by this PUSCH. Also, by means of the PUCCH, downlink radio quality information (CQI: Channel Quality Indicator), ACKs/NACKs and so on are transmitted.

Figure 9:
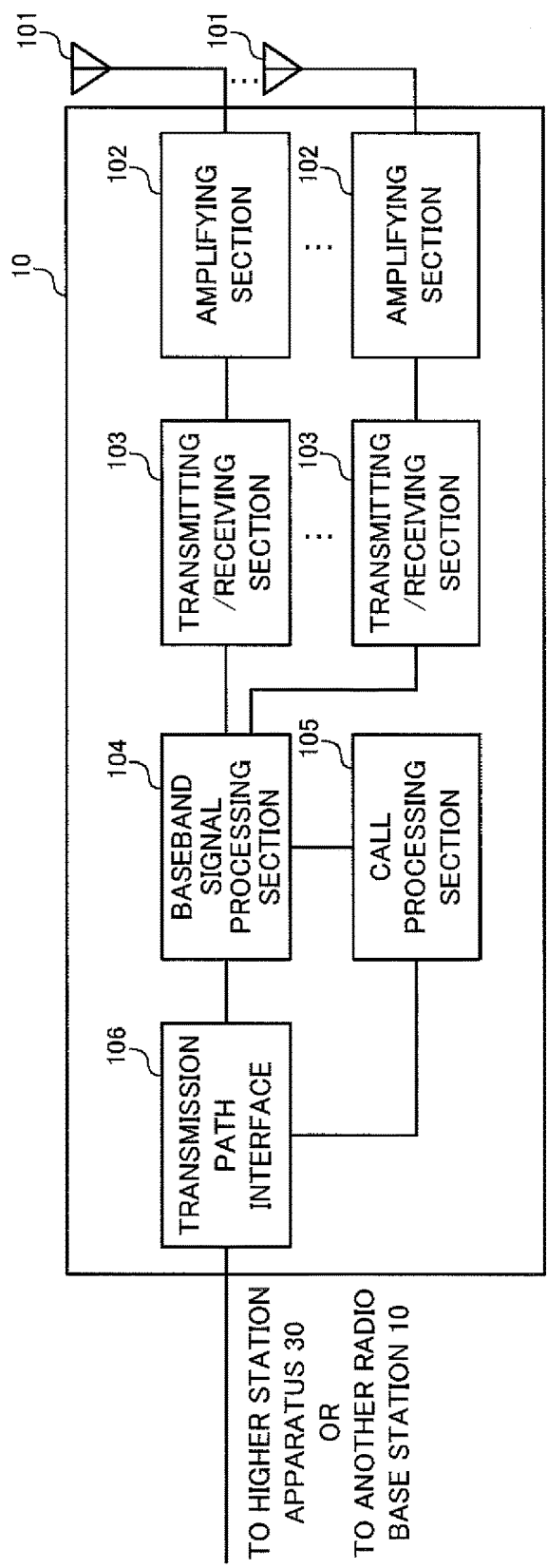
FIG. 9 is a diagram to explain an overall structure of a radio base station according to the present embodiment.

FIG. 9 is a diagram to show an overall structure of a radio base station 10 (which may be either a radio base station 11 or 12) according to the present embodiment. As shown in FIG. 9, the radio base station 10 has a plurality of transmitting/receiving antennas 101 for MIMO transmission, amplifying sections 102, transmitting/receiving sections 103, a baseband signal processing section 104, a call processing section 105 and a transmission path interface 106.

User data to be transmitted from the radio base station 10 to the user terminals 20 on the downlink is input from the higher station apparatus 30, into the baseband signal processing section 104, via the transmission path interface 106.

In the baseband signal processing section 104, a PDCP layer process, division and coupling of user data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process and a precoding process are performed, and the result is forwarded to each transmitting/receiving section 103. Furthermore, downlink control channel signals are also subjected to transmission processes such as channel coding and an inverse fast Fourier transform, and are forwarded to each transmitting/receiving section 103.

Also, the baseband signal processing section 104 reports, to the user terminals 20, control information for allowing communication in the cell, through higher layer signaling (RRC signaling, broadcast signal and so on). The information for allowing communication in the cell includes, for example, the uplink or downlink system bandwidth, feedback resource information and so on. Each transmitting/receiving section 103 converts baseband signals that are pre-coded and output from the baseband signal processing section 104 on a per antenna basis, into a radio frequency band. The amplifying sections 102 amplify the radio frequency signals having been subjected to frequency conversion, and transmit the signals through the transmitting/receiving antennas 101.

On the other hand, as for data to be transmitted from the user terminals 20 to the radio base station 10 on the uplink, radio frequency signals that are received in the transmitting/receiving antennas 101 are each amplified in the amplifying sections 102, converted into baseband signals through frequency conversion in each transmitting/receiving section 103, and input in the baseband signal processing section 104.

In the baseband signal processing section 104, the user data that is included in the input baseband signals is subjected to an EFT process, an IDFT process, error correction decoding, a MAC retransmission control receiving process, and RLC layer and PDCP layer receiving processes, and the result is forwarded to the higher station apparatus 30 via the transmission path interface 106. The call processing section 105 performs call processing such as setting up and releasing communication channels, manages the state of the radio base stations 10 and manages the radio resources.

Figure 10:
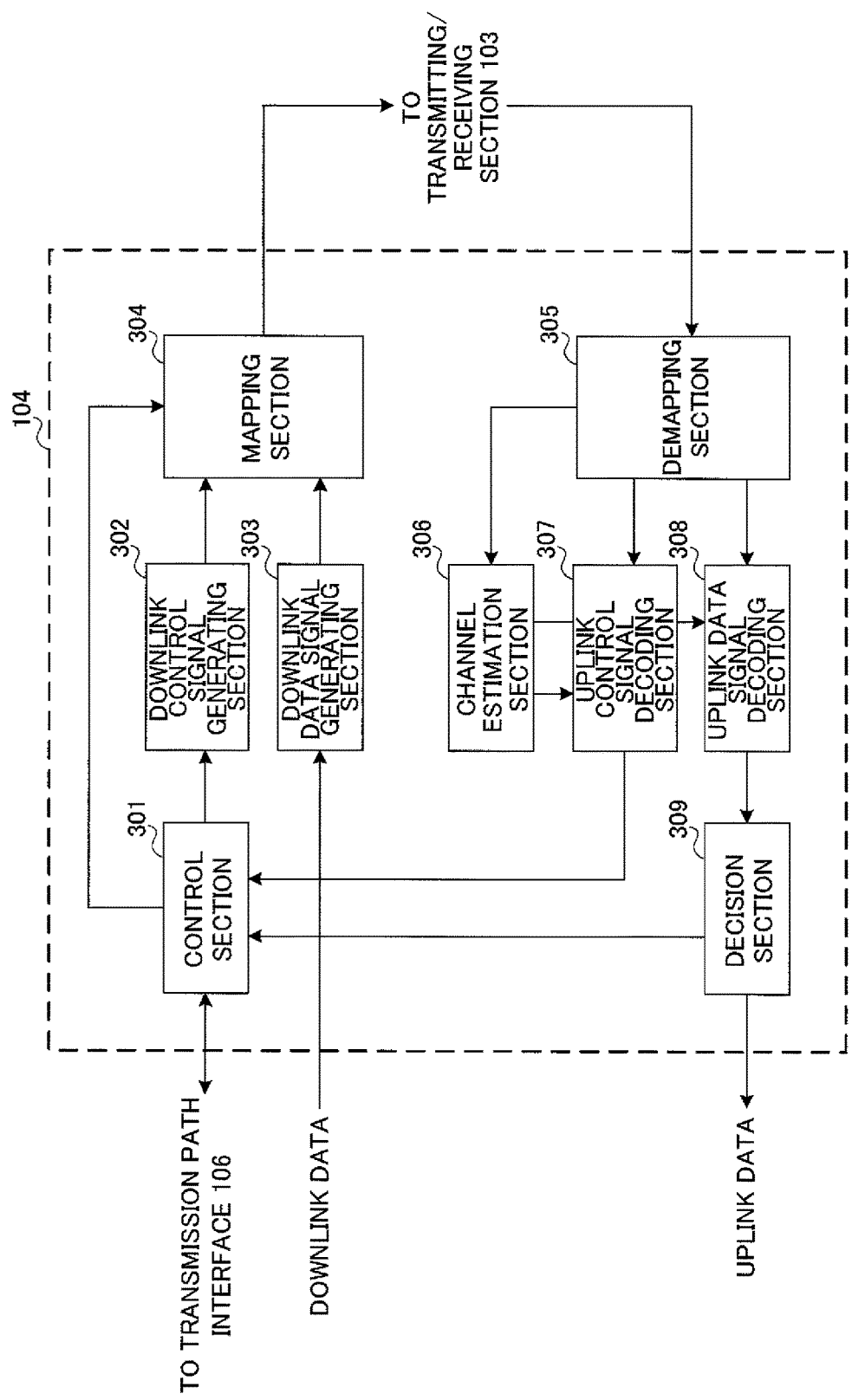
FIG. 10 is a diagram to explain a functional structure of a radio base station according to the present embodiment.

FIG. 10 is a diagram to show a principle functional structure of the baseband signal processing section 104 provided in the radio base station 10 according to the present embodiment. As shown in FIG. 10, the baseband signal processing section 104 provided in the radio base station 10 is comprised at least of a control section 301, a downlink control signal generating section 302, a downlink data signal generating section 303, a mapping section 304, a demapping section 305, a channel estimation section 306, an uplink control signal decoding section 307, an uplink data signal decoding section 308 and a decision section 309.

The control section 301 controls the scheduling of downlink user data that is transmitted in the PDSCH, downlink control information that is transmitted in the PDCCH and/or the enhanced PDCCH (EPDCCH), downlink reference signals and so on. Also, the control section 301 controls the scheduling of uplink data that is transmitted in the PUSCH, uplink control information that is transmitted in the PUCCH or the PUSCH, and uplink reference signals (allocation control). Information about the allocation control of uplink signals (uplink control signals and uplink user data) is reported to user terminals by using a downlink control signal (DCI).

To be more specific, the control section 301 controls the allocation of radio resources with respect to downlink signals and uplink signals, based on command information from the higher station apparatus 30, feedback information from each user terminal 20 and so on. That is, the control section 301 functions as a scheduler. Also, in inter-eNB CA, the control section 301 is provided for each of multiple CCs separately, and, in intra-eNB CA, the control section 301 is provided to be shared by multiple CCs.

The downlink control signal generating section 302 generates downlink control signals (PDCCH signals and/or EPDCCH signals) determined to be allocated by the control section 301. To be more specific, based on commands from the control section 301, the downlink control signal generating section 302 generates a DL assignment to report downlink signal allocation information and a UL grant to report uplink signal allocation information.

For example, in accordance with the above first and second examples, the downlink control signal generating section 302 includes, in downlink control information (DCI), information that relates to the cell that transmits the PUCCH, in subframes in which the FDD cell and the TDD cell are both directed to UL. To be more specific, by using the ARI of the SCell and the ARO, the downlink control signal generating section 302 generates information about the cell which the user terminal uses to transmit A/N's and CQIs (transmission target cell), the PUCCH resource to use in this cell and so on.

Note that the downlink control signal generating section 302 may generate control information by associating the information about the destination cell where the user terminal transmits A/N's and CQIs, with the types of search spaces, the types of control channels, or the locations of the or PDCCH/EPDCCH. In this case, the downlink control signal generating section 302 generates the downlink control information based on commands from the control section 301.

The downlink data signal generating section 303 generates downlink data signals (PDSCH signals). The data signals that are generated in the data signal generating section 303 are subjected to a coding process and a modulation process, based on coding rates and modulation schemes that are determined based on CSI from each user terminal 20 and so on.

Based on commands from the control section 301, the mapping section 304 controls the allocation of the downlink control signals generated in the downlink control signal generating section 302 and the downlink data signals generated in the downlink data signal generating section 303, to radio resources.

The demapping section 305 demaps uplink signals transmitted from the user terminals and separates the uplink signals. The channel estimation section 306 estimates the channel states from the reference signals included in the received signals separated in the demapping section 305, and outputs the estimated channel states to the uplink control signal decoding section 307 and the uplink data signal decoding section 308.

The uplink control signal decoding section 307 decodes the feedback signals (delivery acknowledgement signals, etc.) transmitted from the user terminals through an uplink control channel (PUCCH), and outputs the results to the control section 301. The uplink data signal decoding section 308 decodes the uplink data signals transmitted from the user terminals through an uplink shared channel (PUSCH), and outputs the results to the decision section 309. The decision section 309 makes retransmission control decisions (A/N decisions) based on the decoding results in the uplink data signal decoding section 308, and outputs the results to the control section 301.

Figure 11:
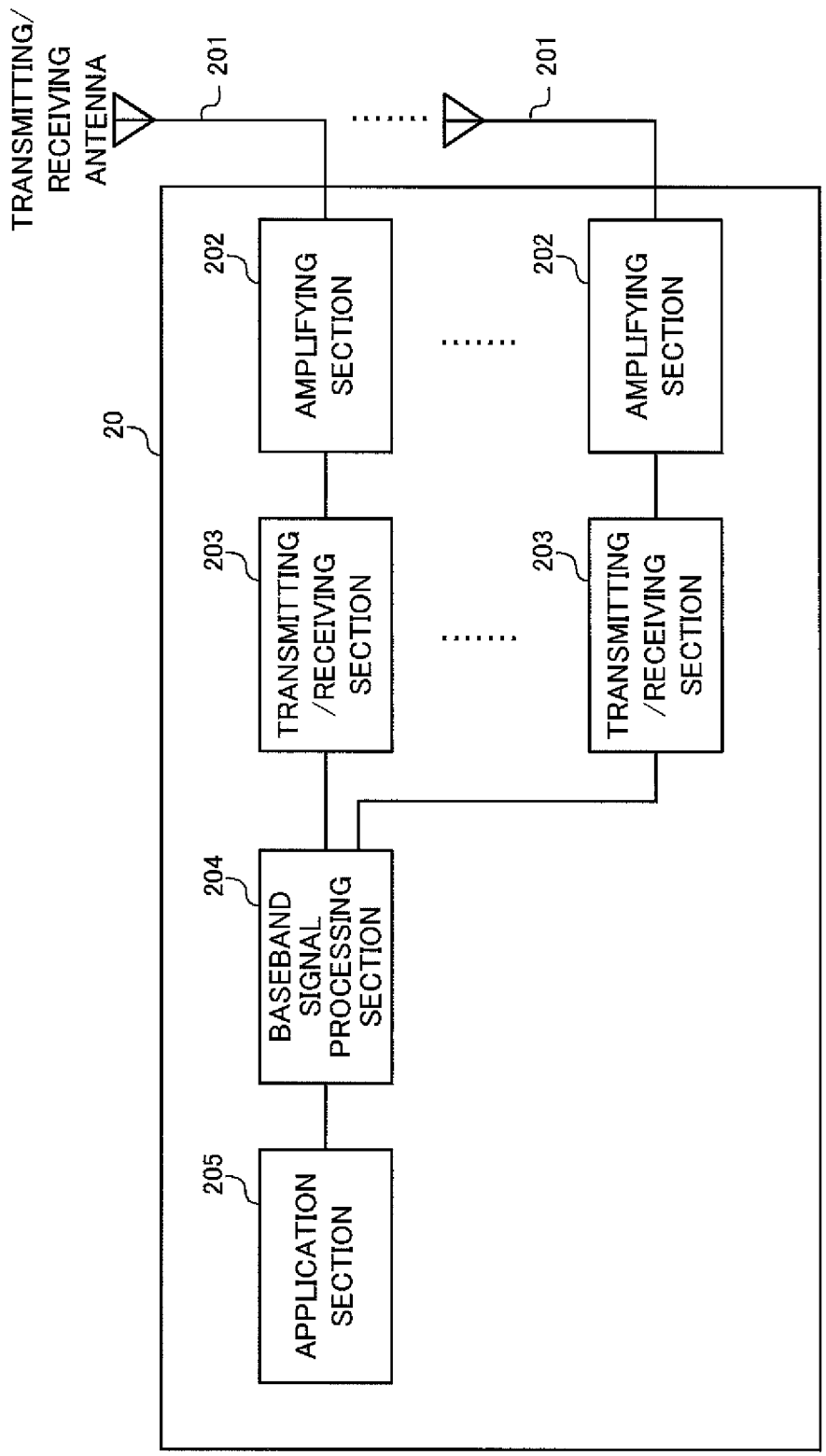
FIG. 11 is a diagram to explain an overall structure of a user terminal according to the present embodiment.

FIG. 11 is a diagram to show an overall structure of a user terminal 20 according to the present embodiment. As shown in FIG. 11, the user terminal 20 has a plurality of transmitting/receiving antennas 201 for MIMO transmission, amplifying sections 202, transmitting/receiving sections (receiving sections) 203, a baseband signal processing section 204 and an application section 205.

As for downlink data, radio frequency signals that are received in the plurality of transmitting/receiving antennas 201 are each amplified in the amplifying sections 202, and subjected to frequency conversion and converted into the baseband signal in the transmitting/receiving sections 203. This baseband signal is subjected to receiving processes such as an FFT process, error correction decoding and retransmission control, in the baseband signal processing section 204. In this downlink data, downlink user data is forwarded to the application section 205. The application section 205 performs processes related to higher layers above the physical layer and the MAC layer. Also, in the downlink data, broadcast information is also forwarded to the application section 205.

Meanwhile, uplink user data is input from the application section 205 to the baseband signal processing section 204. In the baseband signal processing section 204, a retransmission control (H-ARQ (Hybrid ARQ)) transmission process, channel coding, precoding, a DFT process, an IFFT process and so on are performed, and the result is forwarded to each transmitting/receiving section 203. The baseband signal that is output from the baseband signal processing section 204 is converted into a radio frequency band in the transmitting/receiving sections 203. After that, the amplifying sections 202 amplify the radio frequency signals having been subjected to frequency conversion, and transmit the resulting signals from the transmitting/receiving antennas 201.

Figure 12:
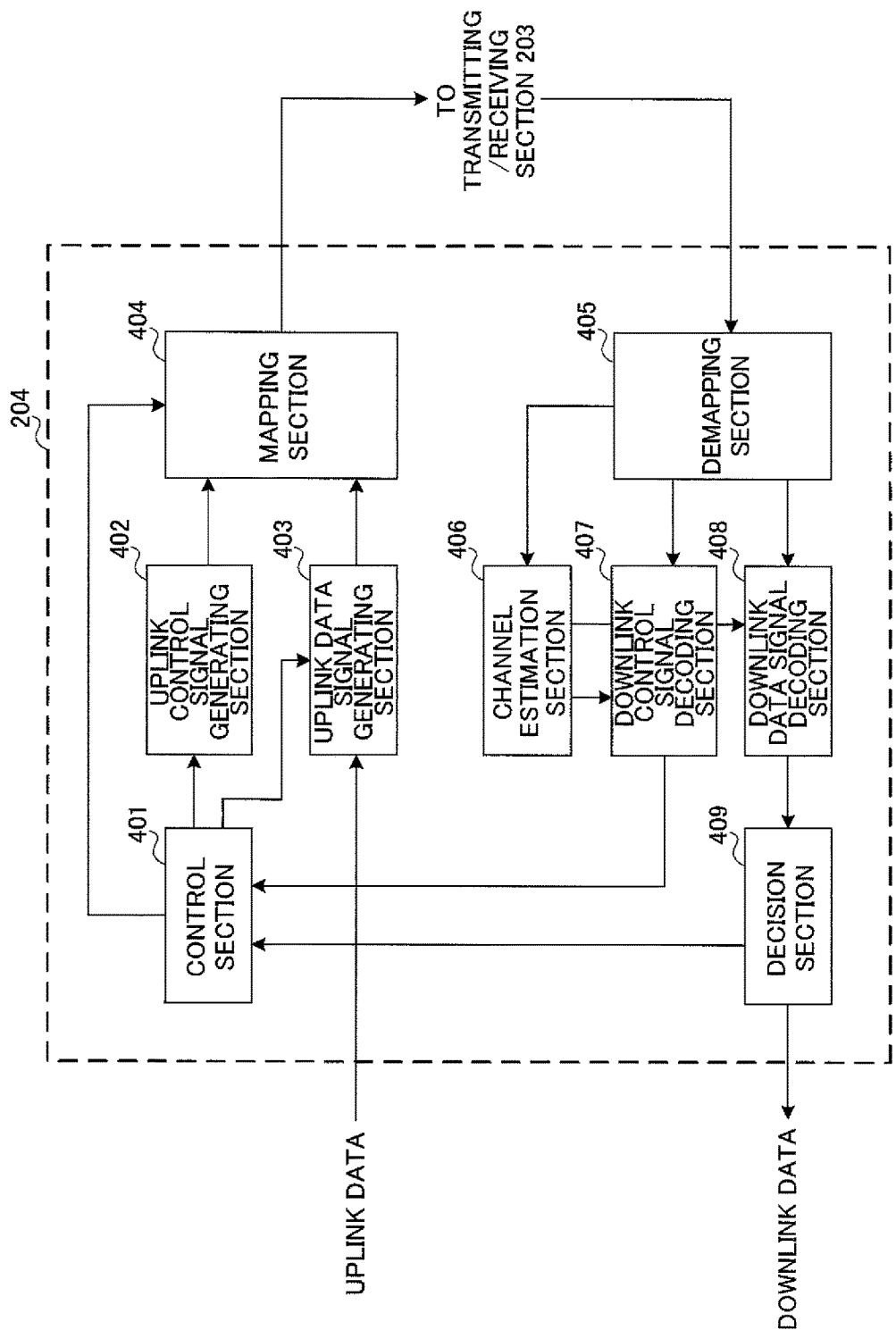
FIG. 12 is a diagram to explain a functional structure of a user terminal according to the present embodiment.

FIG. 12 is a diagram to show a principle functional structure of the baseband signal processing section 204 provided in the user terminal 20. As shown in FIG. 12, the baseband signal processing section 204 provided in the user terminal 20 is comprised at least of a control section 401 (feedback control section), an uplink control signal generating section 402, an uplink data signal generating section 403, a mapping section 404, a demapping section 405, a channel estimation section 406, a downlink control signal decoding section 407, a downlink data signal decoding section 408 and a decision section 409.

The control section 401 controls the generation of uplink control signals (A/N signals and so on) and uplink data signals based on downlink control signals (PDCCH signals) transmitted from the radio base stations, retransmission control decisions with respect to the PDSCH signals received, and so on. The downlink control signals received from the radio base stations are output from the downlink control signal decoding section 408, and the retransmission control decisions are output from the decision section 409.

Also, the control section 401 also functions as a transmission control section that controls the feedback of delivery acknowledgement signals (A/N's) and channel quality information (CQI) in response to PDSCH signals and the transmission of UL scheduling requests. To be more specific, in a communication system to employ CA, the control section 401 determines the cells (or CCs) to transmit A/N's, CQIs and scheduling requests, as well as the PUCCH resources to allocate these to. For example, based on downlink control signals transmitted from the radio base stations and so on, the control section 401 determines the cell to be the transmission destination of an A/N', a CQI and a scheduling request, and indicate these to the mapping section 404.

For example, in accordance with the above-described first example employing TDD–FDD CA, when a UL subframe is configured in both the FDD cell and the TDD cell, the control section 401 executes control so that one cell that transmits an A/N is prioritized, and the transmission of a CQI or a scheduling request is dropped in the other cell (see FIG. 6).

Also, in accordance with the above-described second example employing TDD–FDD CA, when a UL subframe is configured in both the FDD cell and the TDD cell, the control section 401 executes control so that one cell that transmits a CQI or a scheduling requests is prioritized, and an A/N of the other cell is multiplexed on the first cell's PUCCH and transmitted (see FIG. 7).

The uplink control signal generating section 402 generates uplink control signals (feedback signals such as delivery acknowledgement signals, channel state information (CSI) and so on) based on commands from the control section 401. Also, the uplink data signal generating section 403 generates uplink data signals based on commands from the control section 401. Note that, when a UL grant is included in a downlink control signal reported from the radio base stations, the control section 401 commands the uplink data signal generating section 403 to generate an uplink data signal.

The mapping section 404 (allocation section) controls the allocation of uplink control signals (delivery acknowledgement signals, etc.) and uplink data signals to radio resources (PUCCH and PUSCH) based on commands from the control section 401. For example, depending on the CC (cell) to send feedback (PUCCH transmission), the mapping section 404 allocates A/N's to the PUCCH of that CC.

The demapping section 405 demaps a downlink signal transmitted from the radio base station 10 and separates the downlink signal. The channel estimation section 406 estimates the channel state from the reference signals included in the received signal separated in the demapping section 405, and outputs the estimated channel state to the downlink control signal decoding section 407 and the downlink data signal decoding section 408.

The downlink control signal decoding section 407 decodes the downlink control signal (PDCCH signal) transmitted in the downlink control channel (PDCCH), and outputs the scheduling information (information regarding the allocation to uplink resources) to the control section 401. Also, when information related to the cell to feed back delivery acknowledgement signals or information as to whether or not to apply RF tuning is included in a downlink control signal, these pieces of information are also output to the control section 401.

The downlink data signal decoding section 408 decodes the downlink data signal transmitted in the downlink shared channel (PDSCH), and outputs the result to the decision section 409. The decision section 409 makes a retransmission control decision (A/N decision) based on the decoding result in the downlink data signal decoding section 408, and also outputs the result to the control section 401.

Now, although the present invention has been described in detail with reference to the above embodiment, it should be obvious to a person skilled in the art that the present invention is by no means limited to the embodiment described herein. The present invention can be implemented with various corrections and in various modifications, without departing from the spirit and scope of the present invention defined by the recitations of claims. For example, a plurality of examples described above may be combined and implemented as appropriate. Consequently, the description herein is provided only for the purpose of explaining examples, and should by no means be construed to limit the present invention in any way.

The disclosure of Japanese Patent Application No. 2013-199189, filed on Sep. 26, 2013, including the specification, drawings and abstract, is incorporated herein by reference in its entirety.

The invention claimed is:

1. A user terminal comprising:
   a receiver that receives downlink (DL) signals transmitted in a Frequency Division Duplex (FDD) cell and a Time Division Duplex (TDD) cell;
   a processor that allocates delivery acknowledgement signals in response to the received DL signals, channel quality information or scheduling requests in predetermined uplink (UL) subframes; and
   a transmitter that transmits the delivery acknowledgement signals,
   wherein, when Physical Uplink Control Channel (PUCCH) transmission is configured in both the FDD cell and the TDD cell, the processor allocates a delivery acknowledgement signal in UL subframes in one or both of the FDD cell and the TDD cell, the transmitter transmits the delivery acknowledgement signal, and the processor controls the transmitter to transmit the channel quality information or a scheduling request having an overlapping transmission timing with the delivery acknowledgement signal.

2. The user terminal according to claim 1, wherein, when transmission timings of a delivery acknowledgement signal and channel quality information or a scheduling request overlap in the FDD cell or in the TDD cell, the processor multiplexes and the transmitter transmits the channel quality information or the scheduling request on a PUCCH of the cell that transmits the delivery acknowledgement signal.

3. The user terminal according to claim 1, wherein, when transmission timings of a delivery acknowledgement signal and channel quality information or a scheduling request overlap between the FDD cell and the TDD cell, the processor drops transmission of the channel quality information or the scheduling request.

4. The user terminal according to claim 1, wherein, when transmission timings of channel quality information or a scheduling request in the FDD cell and channel quality information or a scheduling request in the TDD cell overlap, while the transmission timings of these channel quality information or scheduling requests overlap a delivery acknowledgement signal, the processor multiplexes and the transmitter transmits the channel quality information or the scheduling request of the cell that transmits the delivery acknowledgement signal, on the PUCCH of this cell, while the processor drops transmission of the channel quality information or the scheduling request of the other cell.

5. The user terminal according to claim 1, wherein, when transmission timings of channel quality information or a scheduling request of the FDD cell and channel quality information or a scheduling request of the TDD cell overlap, while the transmission timings of these channel quality information or scheduling requests do not overlap a delivery acknowledgement signal, the processor multiplexes and the transmitter transmits the channel quality information or the scheduling request of one of the FDD cell and the TDD cell on a PUCCH, while the processor drops transmission of the channel quality information or the scheduling request of the other cell.

6. The user terminal according to claim 1, wherein, when transmission timings of a delivery acknowledgement signal and channel quality information or a scheduling request overlap in one or both of the FDD cell and the TDD cell, the processor multiplexes and the transmitter transmits the delivery acknowledgement signal, and the channel quality information or the scheduling request upon a PUCCH of each cell.

7. The user terminal according to claim 1, wherein, when transmission timings of a delivery acknowledgement signal of the FDD cell or the TDD cell and channel quality information or a scheduling request of the FDD cell or the TDD cell overlap, the processor multiplexes and the transmitter transmits the delivery acknowledgement signal upon a PUCCH of the cell that transmits the channel quality information or the scheduling request.

8. The user terminal according to claim 1, wherein, when transmission timings of a delivery acknowledgement signal of the FDD cell or the TDD cell and channel quality information or a scheduling request of one or both of the FDD cell and the TDD cell overlap, the processor multiplexes and the transmitter transmits the delivery acknowledgement signal on a PUCCH of one of the FDD cell and the TDD cell that transmits the channel quality information or the scheduling request, while dropping transmission of the channel quality information or the scheduling request of the other cell.

9. A base station comprising:
a processor that generates a downlink (DL) signal;
a transmitter that transmits the DL signal to the user terminal in a DL subframe of one of a Frequency Division Duplex (FDD) cell and a Time Division Duplex (TDD) cell; and
a receiver that receives, in an uplink (UL) subframe of the one of the FDD cell and the TDD cell, a delivery acknowledgement signal transmitted from the user terminal in response to the DL signal, channel quality information or a scheduling request,
wherein the processor generates information about a transmission destination of delivery acknowledgement signals, channel quality information or scheduling requests transmitted from the user terminal if Physical Uplink Control Channel (PUCCH) transmission is configured at a same timing as in another base station, of the other of the FDD cell and the TDD cell.

10. A transmission control method for a user terminal comprising the steps of:
receiving downlink (DL) signals transmitted in a Frequency Division Duplex (FDD) cell and a Time Division Duplex (TDD) cell; and
allocating and transmitting delivery acknowledgement signals in response to the received DL signals, channel quality information or scheduling requests in predetermined uplink (UL) subframes,
wherein, when Physical Uplink Control Channel (PUCCH) transmission is configured in both the FDD cell and the TDD cell, a delivery acknowledgement signal is transmitted in UL subframes in one or both of the FDD cell and the TDD cell, and transmission of channel quality information or a scheduling request having an overlapping transmission timing with the delivery acknowledgement signal is controlled.

* * * * *